US006973238B2

(12) United States Patent
Soda et al.

(10) Patent No.: US 6,973,238 B2
(45) Date of Patent: Dec. 6, 2005

(54) OPTICAL SWITCH AND OPTICAL COMMUNICATION SYSTEM

(75) Inventors: Haruhisa Soda, Hachioji (JP); Shigeru Nakagawa, Hachioji (JP)

(73) Assignee: Fibest, Ltd., Tokyo (JP)

( * ) Notice: Subject to any disclaimer, the term of this patent is extended or adjusted under 35 U.S.C. 154(b) by 69 days.

(21) Appl. No.: 10/655,769

(22) Filed: Sep. 5, 2003

(65) Prior Publication Data

US 2004/0081389 A1    Apr. 29, 2004

Related U.S. Application Data

(63) Continuation-in-part of application No. 10/236,341, filed on Sep. 5, 2002, now Pat. No. 6,836,573.

(51) Int. Cl.$^7$ .............................. G02B 6/42; G02B 6/26
(52) U.S. Cl. .............................. 385/41; 385/16; 385/21
(58) Field of Search ................................ 385/2, 16, 14, 385/15, 31, 32, 37, 41, 122, 123, 130, 129, 385/27

(56) References Cited

U.S. PATENT DOCUMENTS

| | | | |
|---|---|---|---|
| 4,012,113 A | * | 3/1977 | Kogelnik et al. ............. 385/21 |
| 4,714,311 A | | 12/1987 | Auracher |
| 5,850,098 A | * | 12/1998 | Butler et al. ................. 257/467 |
| 5,917,980 A | * | 6/1999 | Yoshimura et al. ......... 385/129 |
| 5,995,691 A | * | 11/1999 | Arai et al. ..................... 385/37 |
| 6,064,787 A | * | 5/2000 | Castoldi ...................... 385/41 |
| 6,091,864 A | * | 7/2000 | Hofmeister .................... 385/2 |
| 6,338,975 B1 | * | 1/2002 | Yoshimura et al. ........... 438/29 |
| 6,534,725 B2 | * | 3/2003 | Tsukahara ................... 174/260 |
| 6,778,723 B1 | * | 8/2004 | Yang ........................... 385/16 |

FOREIGN PATENT DOCUMENTS

JP         61 240227         10/1986

OTHER PUBLICATIONS

Prof. F. Koyama et al., entitled "Frequency Chirping in External Modulators," *IEEE Journal of Lightwave Technology*, vol. LT-6, No. 1, pp 87-93 Jan. 1988.
Dr. R. C. Alferness et al., entitled "High-Speed Traveling-Wave Directional Coupler Switch/Modulator for λ=1.32 μm," *IEEE Journal of Quantum Electronics*, vol. QE-19, No. 9, pp 1339-1341, Sep. 1983.
Lucas b. Soldano et al., "Optical Multi-Mode Interference Devices Based on Self-Imaging: Principles and Applications," *Jouirnal of Lightwave Technology*, vol. 13, No. 4, pp 615-627, Apr. 1995.
Dr. R.G. Waker et al., "Low-voltage, 50 ohm GaAs/AlGaAs Traveling-wave Modulator with bandwidth exceeding 25 GHz," Electronics Letters, 9 vol. 25 No. 23 pp. 1549-1550, Nov. 1989.

(Continued)

*Primary Examiner*—Thien M. Le
(74) *Attorney, Agent, or Firm*—Townsend and Townsend and Crew LLP

(57) ABSTRACT

A directional coupler type optical modulator with traveling-wave electrodes includes a first directional coupler region, a waveguide wave coupling region, a second directional coupler region, and a set of noncrossing traveling-wave electrodes disposed along the outside of the waveguides. The electrodes of each directional coupler are connected to the traveling-wave electrodes via air-bridges. The waveguide structures are of the P-I-N type having a common N-type conducting layer which provides delta-beta operation of the directional coupler, and both cross and bar states are controlled by a single input signal.

17 Claims, 25 Drawing Sheets

OTHER PUBLICATIONS

Alferness et al. "High-speed Traveling-Wave Directional Coupler Switch/Modulator for λ=1.32 μm," IEEE Journal of Quantum Electrionics USA, vol. QE-19, No. 9, Sep. 1983, pp. 1339-1341.

Komatsu et al., "4×4 GaAs/AlGaAs Optical Matrix Switches with Uniform Device Characteristics Using Alternating Δβ Electrooptic Guided-Wave Directional Couplers,"Journal of Lightwave Technology, IEEE, Jul. 9, 1991, No. 7, New York, pp. 871-878.

Walker et al., "Low-Voltage, 50Ω, GaAs/AlGaAs Travelling-Wave Modulator with Bandwidth Exceeding 25 GHz," Electronics Letters , IEE Stevenage, GB, vol. 25, No. 23, Nov. 1989, pp. 1549-1550.

* cited by examiner

OPTICAL SWITCH AND OPTICAL COMMUNICATION SYSTEM

CROSS-REFERENCES TO RELATED APPLICATIONS

This application is a continuation-in-part of U.S. application Ser. No. 10/236,341, filed Sep. 5, 2002, now U.S. Pat. No. 6,836,573, which disclosure is incorporated herein by reference.

BACKGROUND OF THE INVENTION

1) Field of the Invention

The present invention relates to optical switches or modulators and more particularly to an ultra-high speed optical modulator suitable for optical fiber transmission systems.

2) Description of the Related Art

In order to extend the transmission distance at data rates of several Gb/s, a transmitter module with an external optical modulator is widely used due to its controllability and low chirp characteristics in order to minimize eye pattern degradation induced by the fiber dispersion. A semiconductor optical modulator is attractive because of its potentially small size and its low drive voltage. In a prior investigation reported in an article by Prof. F. Koyama et al., entitled "Frequency Chirping in External Modulators," IEEE Journal of Lightwave Technology, Vol. LT-6, No. 1, January 1988, it was proposed that an optical directional coupler modulator might be able to provide both zero chirp and controllable chirp characteristics.

In an article by Dr. R. C. Alferness et al., entitled "High-Speed Traveling-Wave Directional Coupler Switch/Modulator for $\lambda=1.32$ $\mu$m (micrometer)," IEEE Journal of Quantum Electronics, Vol. QE-19, No. 9, September 1983, it was reported that a simple directional coupler modulator using Ti:LiNbO3 material had operated at 7.2 GHz (gigahertz). As modulation frequency increases to the order of several GHz, a traveling wave electrode configuration is preferable because the cut-off frequency is not limited by a parasitic RC time constant.

The structure of a prior reverse delta beta type directional coupler modulator 2 is shown in FIG. 1 The delta beta type directional coupler modulator 2 includes a pair of waveguides 10, 11 having mutually parallel electrodes 12, 13, 14, 15 in sufficient proximity for delta-beta switched directional coupling. To operate such a device, two electrical modulation signals from sources 16, 17 with opposite signs are required. For L larger than the coupling length of the directional coupler and shorter than three times the coupling length, cross state and bar state are obtained for specific applied voltages Vc and Vb. In the cross state, when the bias voltage is Vc, the input light (optical radiation) of upper waveguide 18 is split into an upper and lower waveguides 10 and 11 at the end of what is the first directional coupler with 50% of input power distributed to each. Then by the reciprocity of reverse delta-beta type directional coupler modulator, the output light (optical radiation) comes out from only the lower waveguide 19 at the end of what is the second directional coupler. In the bar state, when the bias voltage is Vb, the input light of an upper waveguide 18 propagates only to the upper waveguide 20 at the end of the second directional coupler because of a larger phase mismatch. Accordingly both cross and bar state can be controlled completely by signal voltages with a wide fabrication tolerance of the structural parameters.

Dr. R. G. Waker et al. in an article entitled "Low-voltage, 50 ohm, GaAs/AlGaAs Traveling-wave Modulator with bandwidth exceeding 25 GHz," Electronics Letters, 9 Nov. 1989 vol. 25 No. 23 pp. 1549–1550, have proposed a traveling-wave Mach-Zehnder electro-optic modulator to provide periodic capacitive loading to a separate coplanar transmission line. Such a design is depicted by FIG. 2, which shows a prior art reverse delta beta type directional coupler modulator 4 using such a traveling-wave electrode configuration. A modulation signal is supplied by one signal generator 21 and terminates at a load 22. In order to apply opposite sign signals for a first directional coupler 23 and a second 24 directional coupler, the traveling-wave electrodes 25, 26 must be bent and crossed at the center 5 as shown in FIG. 2. It is also strongly desired to completely isolate the first and second directional coupler electrically to obtain efficient phase mismatches. However it is very difficult to realize this structure without degradations of RF wave and optical transmission characteristics. The crossing of traveling-wave electrode induces the reflection of the RF wave and weak grounding.

However, a simple directional coupler modulator is difficult to fabricate because the chip length needs to be precisely controlled to be an odd number multiple of the coupling length to yield a good extinction ratio. U.S. Pat. No. 4,012,113 disclosed that a reverse delta-beta type directional coupler modulator is suited for practical application due to a wide fabrication tolerance. This reverse delta-beta type directional coupler modulator requires two sets of control elements to achieve a phase mismatch of opposite sign. However, it is difficult to form a traveling wave type electrode configuration using this structure. Thus, what is needed is an optical modulator with both a traveling wave electrode configuration and a directional coupler with a wide fabrication tolerance.

SUMMARY OF THE INVENTION

An optical switch according to one aspect of the present invention includes a first optical waveguide through which light propagates; a second optical waveguide arranged at a position where optical crossing occurs with respect to the first optical waveguide, through which light propagates; a first lead electrode arranged along the first and the second optical waveguides; a pair of first control electrodes arranged along the first optical waveguide so as to face each other, with the crossing portion put therebetween, to which a control voltage controlling the crossing state is applied via the first lead electrode; a second lead electrode arranged so as to face the first lead electrode; and a pair of second control electrodes arranged along the second optical waveguide so as to face each other, with the crossing portion arranged therebetween, to which the control voltage is applied via the second lead electrode.

An optical communication system according to another aspect of the present invention includes the optical switch according to the above mentioned aspect of the present invention.

The other objects, features and advantages of the present invention are specifically set forth in or will become apparent from the following detailed descriptions of the invention when read in conjunction with the accompanying drawings.

DETAILED DESCRIPTION

Figure 1:
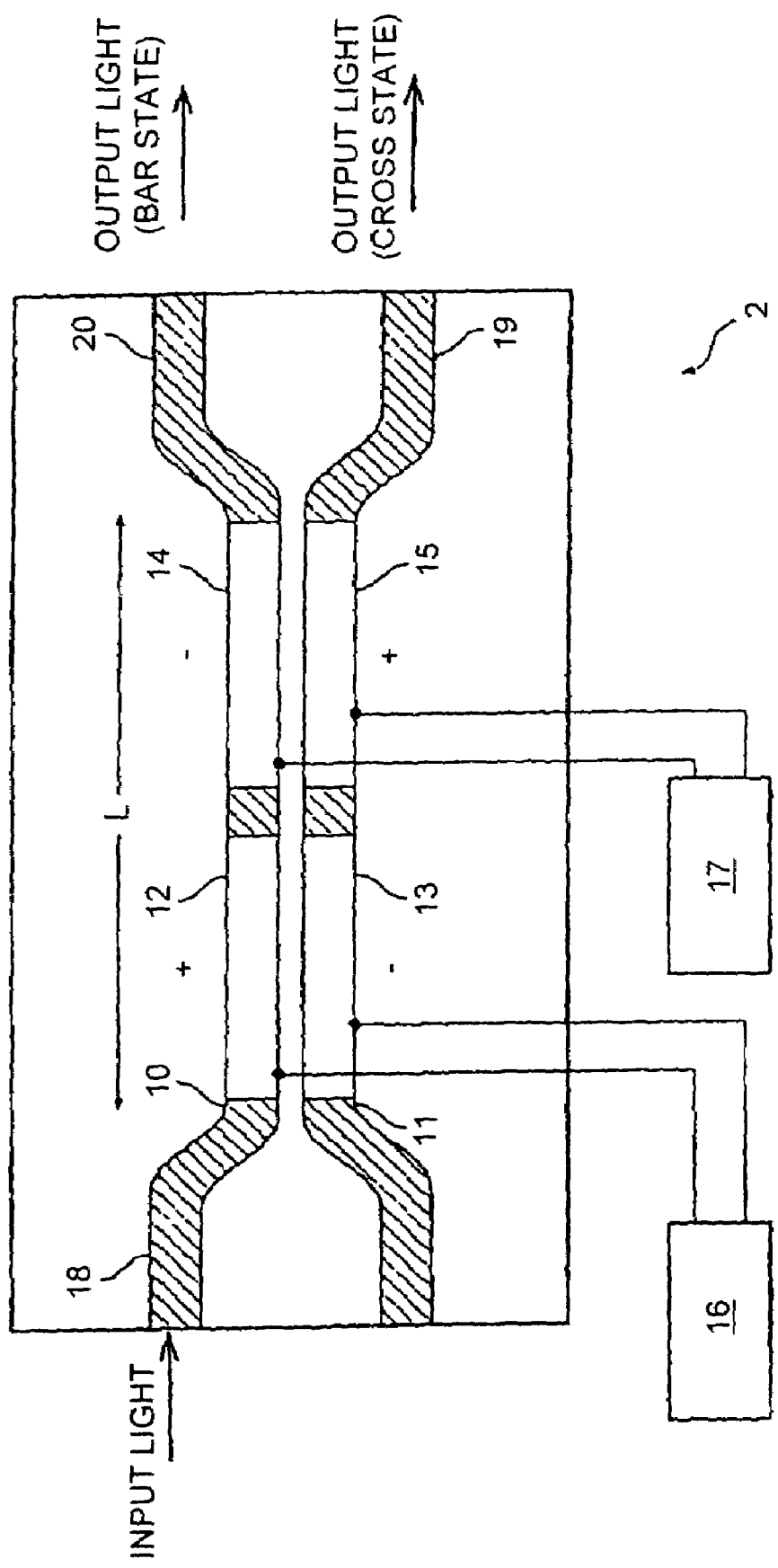
FIG. 1 is a prior art reverse delta beta type directional coupler modulator.
Figure 2:
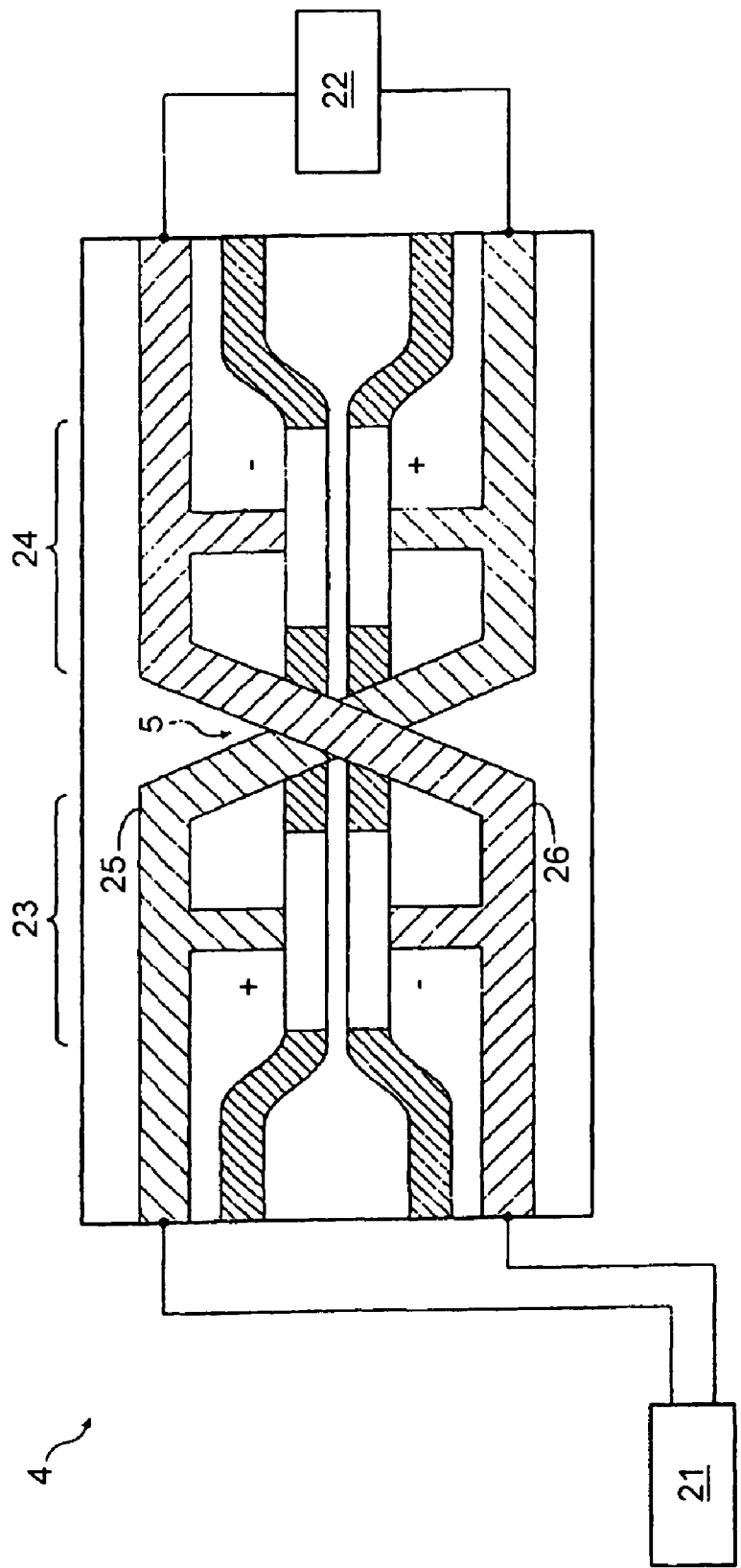
FIG. 2 is a prior art reverse delta beta type traveling-wave directional coupler modulator.
Figure 3:
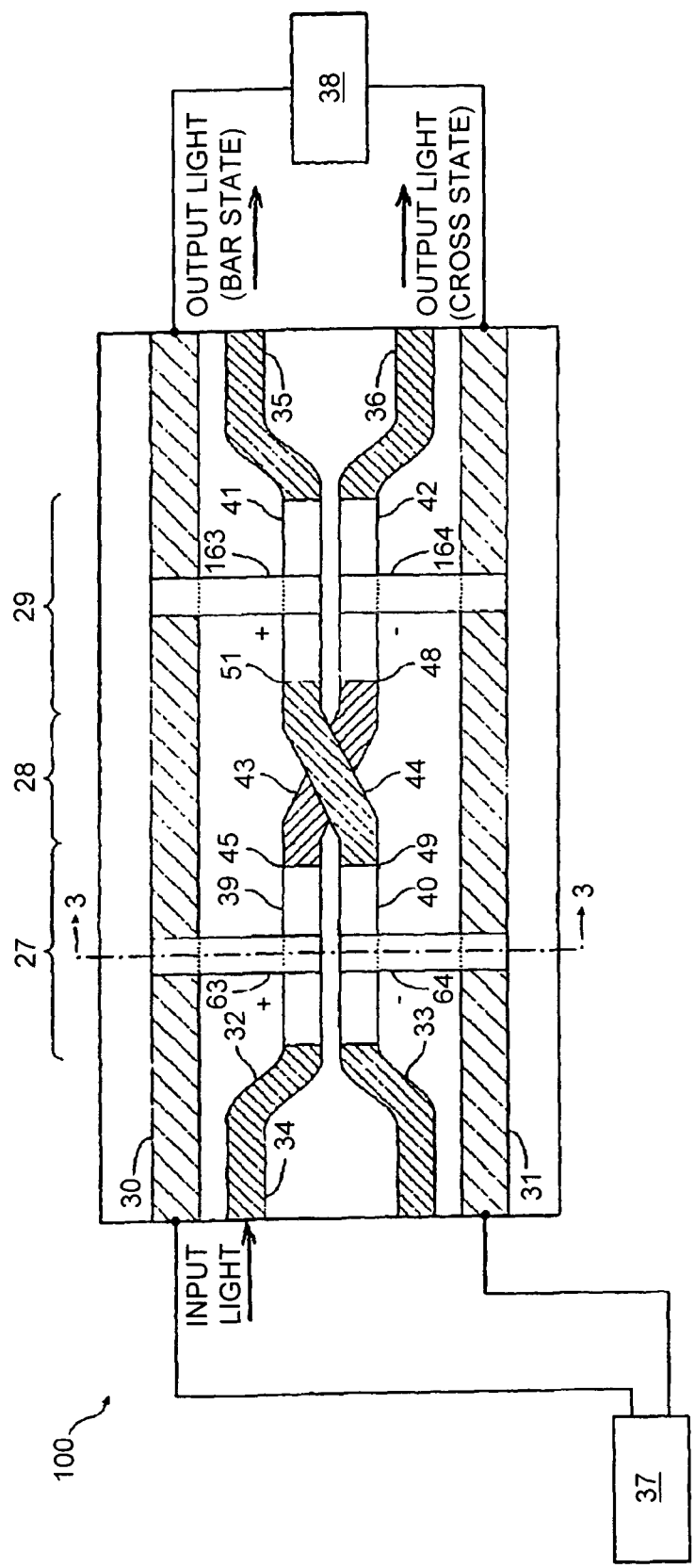
FIG. 3 is a directional coupler modulator according to a first embodiment of the present invention.
Figure 4:
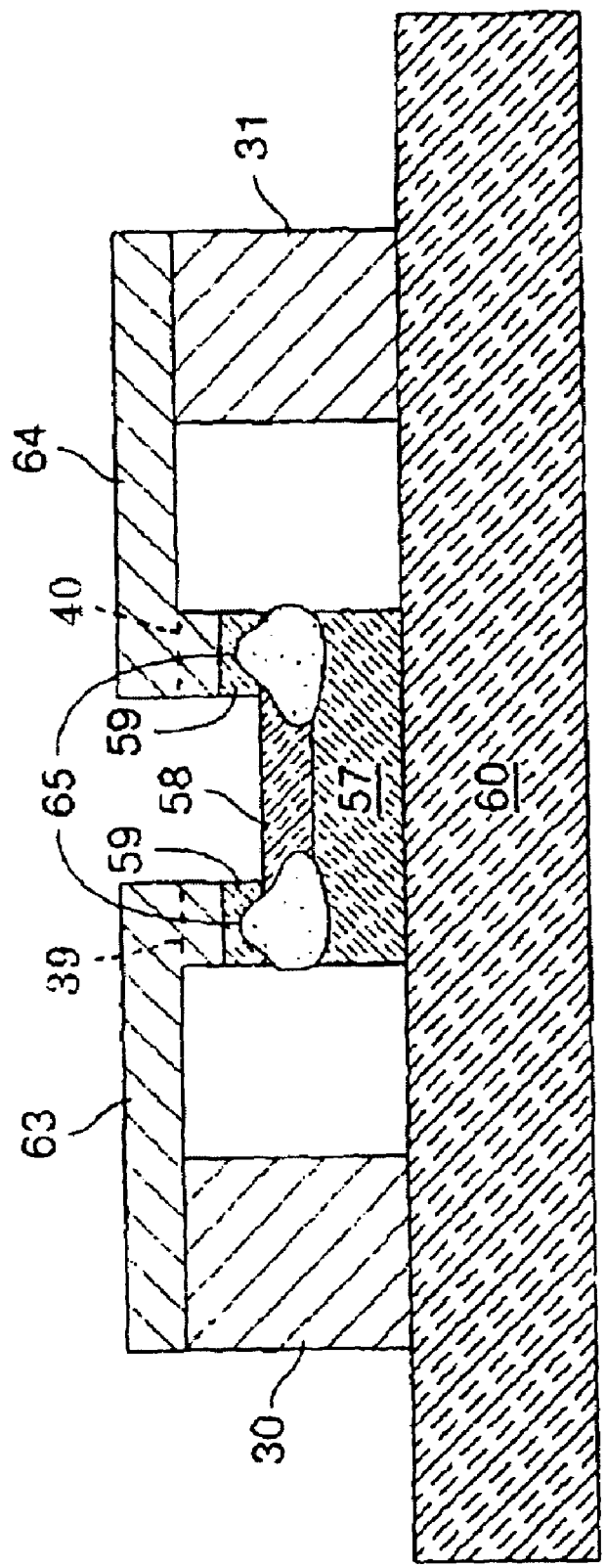
FIG. 4 is a cross-sectional view of the directional coupler modulator according to the first embodiment.

FIG. 3 illustrates a directional coupler modulator 100 according to a first embodiment of the present invention. FIG. 4 illustrates a cross-sectional view of the directional coupler modulator 100 across the center of the element, which corresponds to the position for example of section 3—3 of FIG. 3.

The optical modulator formed of optical waveguides 32, 33 includes a section defined as a first directional coupler 27, a section defined as a cross waveguide 28 and a section defined as a second directional coupler 29. Each directional coupler is of the delta beta type having two waveguides with a specific desired coupling length. The two optical waveguides 32, 33 cross one another at central segments 43, 44 corresponding to the cross waveguide 28 as shown in FIG. 3. Specifically, the upper output port at 45 of the first directional coupler 27 is connected to the lower input port at 48 of the second directional coupler 29. Similarly, the lower output port of the first directional coupler 27 at 49 is connected to the upper input port at 51 of the second directional coupler 29. In this central region, the two waveguide segments 43, 44 do not work as a directional coupler. The traveling-wave electrodes 30, 31 do not have any bending or crossing. The two traveling-wave electrodes 30, 31 are connected directly with no loss. The first directional coupler 27 has electrodes 39 and 40, the second directional coupler 29 has electrodes 41 and 42.

The optical directional modulator 100 of the invention can control both cross and bar states by an input voltage signal like a conventional reverse delta beta type directional coupler modulator. There is no need to use two input signals with opposite polarities. It should also be noted that the invention allows for one input signal drive and a traveling-wave electrode configuration.

The operation of the optical directional modulator 100 is as follows. With transmission, an electric field is applied to the electrodes 39, 40, 41, 42 on the directional coupler waveguide through a set of air-bridges 63, 64, 163, 164 to attain a delta-beta operational mode. However, in this state, the polarities of the first and second directional coupler modulators are the same (which differs from the conventional reverse delta-beta type directional coupler modulator). When the total length of the first and second directional coupler is larger than the coupling length of the directional coupler and shorter than three times the coupling length, path switching can be achieved effectively. At the bias voltage of Vb for low phase mismatches, the input light of an upper waveguide 34 is split into the upper and lower waveguides at the end of the first directional coupler, each with 50% input power. By adopting a cross waveguide 28 showed in FIG. 3, electrical signal polarities of the first and second directional coupler 27, 29 can be kept the same. This invention eliminates RF signal crossing, and improves RF performance. In the present modulator, the output light moves only in the upper waveguide 35 at the bias voltage of Vb. On the other hand, when the bias voltage is Vc, the input light of an upper waveguide 34 returns only to the upper waveguide at the end of the first directional coupler because of a larger phase mismatch. After propagation of light in the crossing waveguide, the light propagates into the lower waveguide of the second directional coupler. In the second directional coupler, the bias voltage of Vc is also applied as shown in FIG. 3. Then the output light at the end of the second directional coupler returns to the lower waveguide 36. Accordingly both bar and cross states can be controlled completely by signal voltages with a wide fabrication tolerance of the structural parameters.

Figure 5:
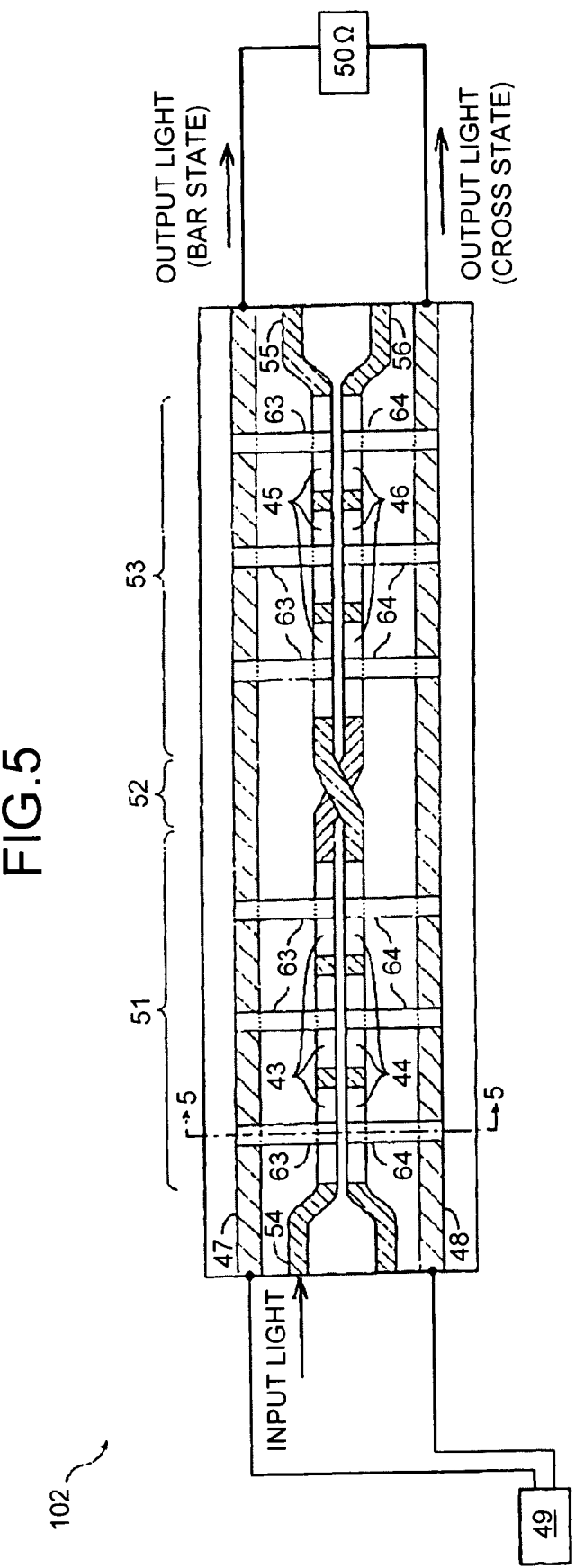
FIG. 5 is a directional coupler modulator according to a second embodiment of the present invention.

It is preferable that, the lengths of the electrodes 39, 40, 41, 42 as shown in FIG. 3 must be shorter than the wavelength of the electrical signal through the traveling-wave electrodes 30, 31, because longer electrodes seriously affect the traveling-wave characteristics and induce a large amount of transmission loss. FIG. 5 shows a directional coupler modulator 102 according to a second embodiment of the present invention which has a structure that overcomes such difficulty. The electrodes are divided and electrically connected to each directional coupler as shown in the figure as two sets of triple segments 43, 44 and 45, 46. Each electrode segment is connected to outer traveling-wave electrode strips 47, 48 independently through an air-bridge 63, 64. An electrical drive signal from the signal generator 49 is applied to the input port of each of the traveling-wave electrodes 47, 48 and then is propagated to each electrode 43, 44, 45, 46 through the respective traveling-wave electrode 47, 48 and the air-bridge 63, 64. The electrical signal is terminated by a load resistance 50.

The optical waveguide topology is the same as in FIG. 3. The first directional coupler 51, the cross waveguide region 52, and the second directional coupler 53 are cascade connected. Thus, incident light coupled to the input waveguide 54 is switched to the output waveguide 55 or 56 by the input signal voltage.

This configuration leads to a low loss electrical transmission where the modulator is long compared to the wavelength of the signal of interest. An input impedance can be maintained to a desired value (typically 50 ohm) even for a longer modulator, based on a similar configuration.

Figure 6:
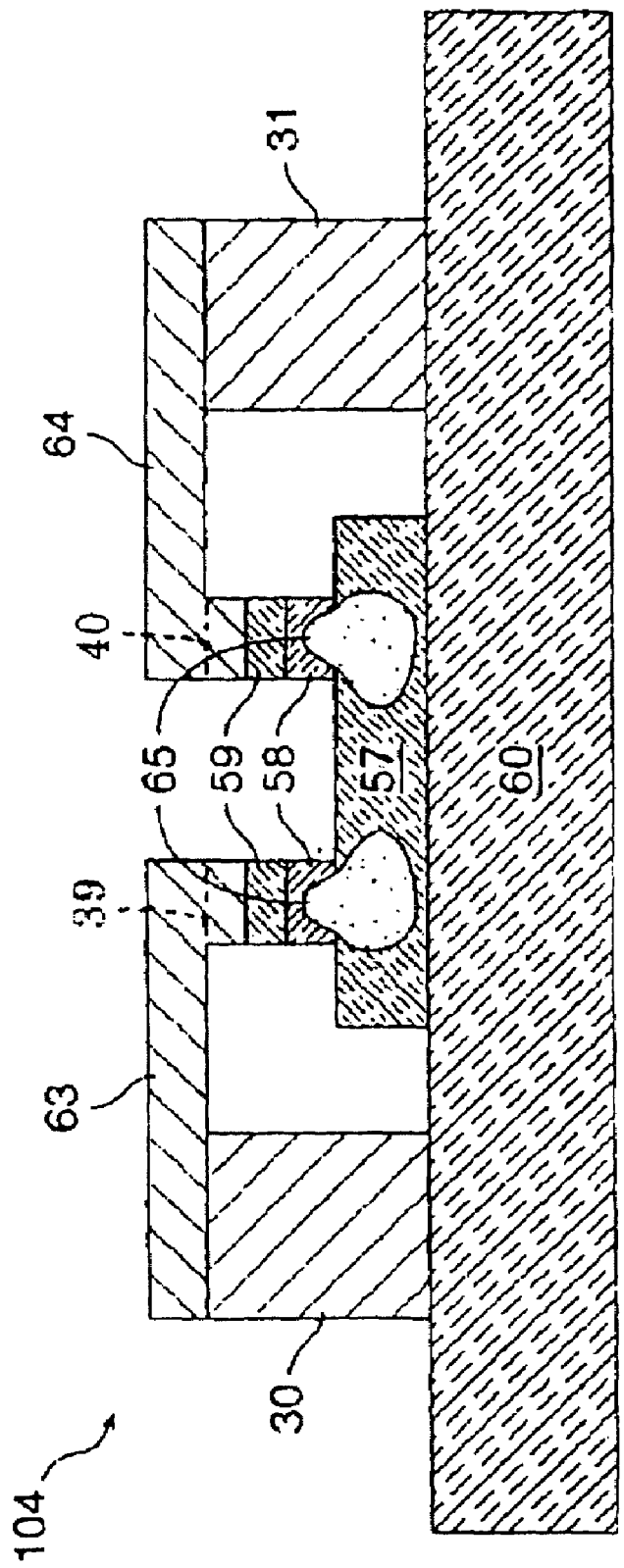
FIG. 6 is a cross-sectional view of a directional coupler modulator according to a third embodiment of the present invention.
Figure 7:
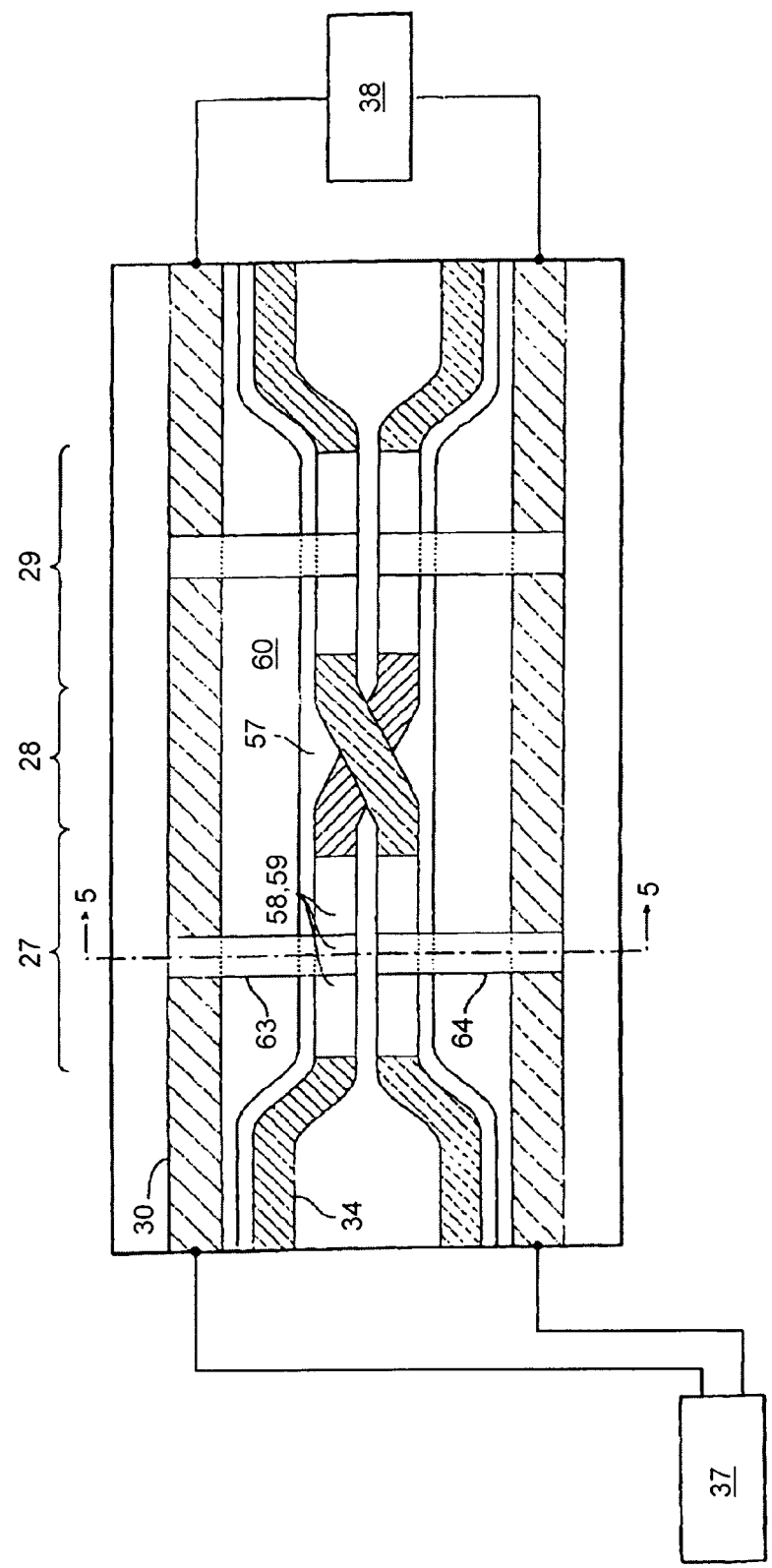
FIG. 7 is a top view of a directional modulator according to the third embodiment of the invention.

FIG. 6 shows a cross-sectional view of a directional coupler modulator 100 across the center of the element, which corresponds to the position for example of section 5—5 of FIG. 7, according to a third embodiment of the invention. In this structure, the optical waveguide employs a ridge waveguide structure. An N-cladding layer 57, an intrinsic core (hereinafter, "I-core") layer 58, and a P-cladding layer 59 which serves as an electrode are disposed on a substrate 60. The electrical signals are fed from the traveling-wave electrodes 30, 31 through air bridges 63, 64 to the P-cladding layer. The air bridge structure allows the drive voltage to be minimized by keeping the electric field well confined within the I-type region, and the N-type layer is preferably kept completely floating to both the outer electrodes for DC-bias. The electrode is separated from the N-type layer and is coupled directly to the P-type layer. Although an insulative layer could be used instead of an air bridge, the thickness would need to be much greater than is suited to the selected semiconductor fabrication process. For this reason the air bridge structure is preferred. The optical beams represented by regions 65 are confined in the I-core layer 58 by the higher refractive index in the structure of layer 58, but they can couple with the adjacent waveguide through the N-cladding layer 57. On the other hand, a microwave signal from the traveling-wave electrodes 30, 31 fed by the air-bridges 63, 64 is concentrated only in the I-core layer 58 of each waveguide by the P-I-N structure. Thus, an overlap between the optical intensity and microwave signal intensity in the I-core layer increases and reduces the drive voltage as the coupling length is adjusted.

Figure 8:
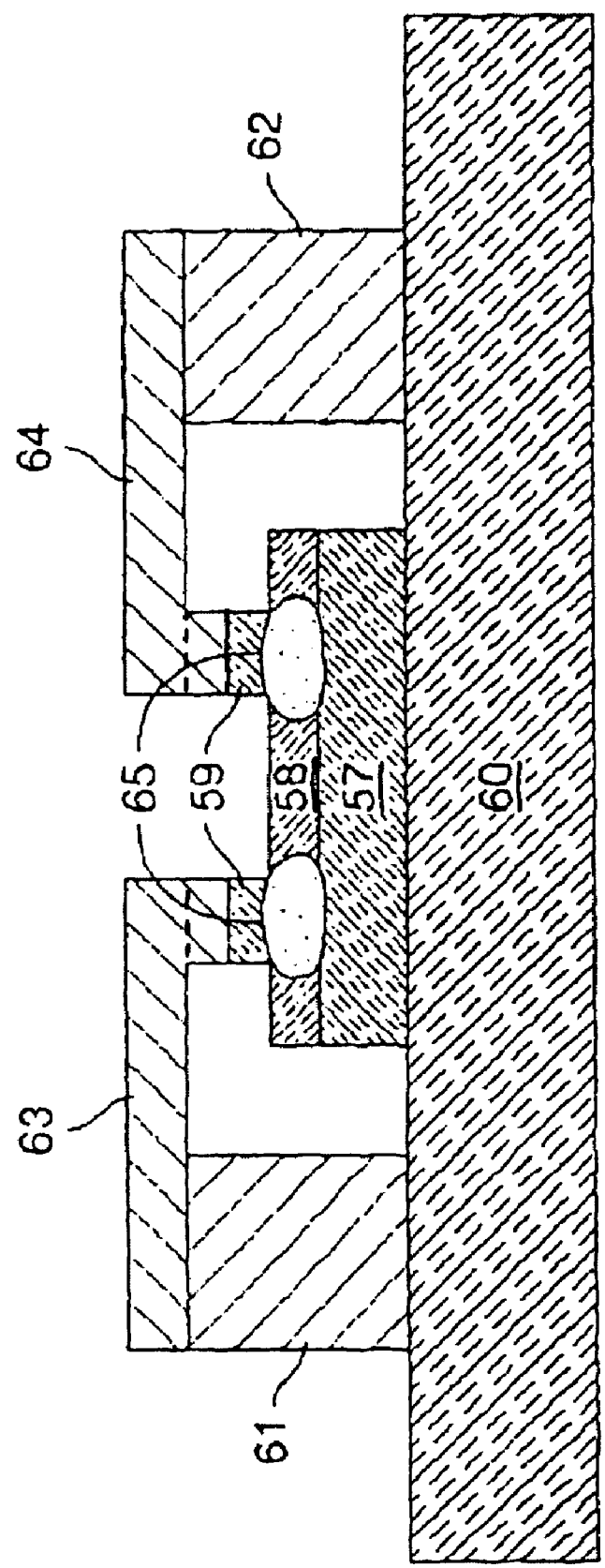
FIG. 8 is a cross section of a directional coupler modulator according to a fourth embodiment of the present invention.

FIG. 8 is a modification of the structure of FIG. 6 in a further embodiment in which there is no ridge structure. The ridgeless structure involves a common I-core layer 58 extends across and upon the common N-cladding layer 57. Removal of the portion of the I-core layer 58 between the bridges is not necessary. Furthermore, the optical coupling occurs directly in this layer. It is to be noted that the coupling strength between the two waveguides can be specified by defining the separation between the two waveguides. Optical confinement in the I-core layer 58 can be kept quite large.

Figure 9:
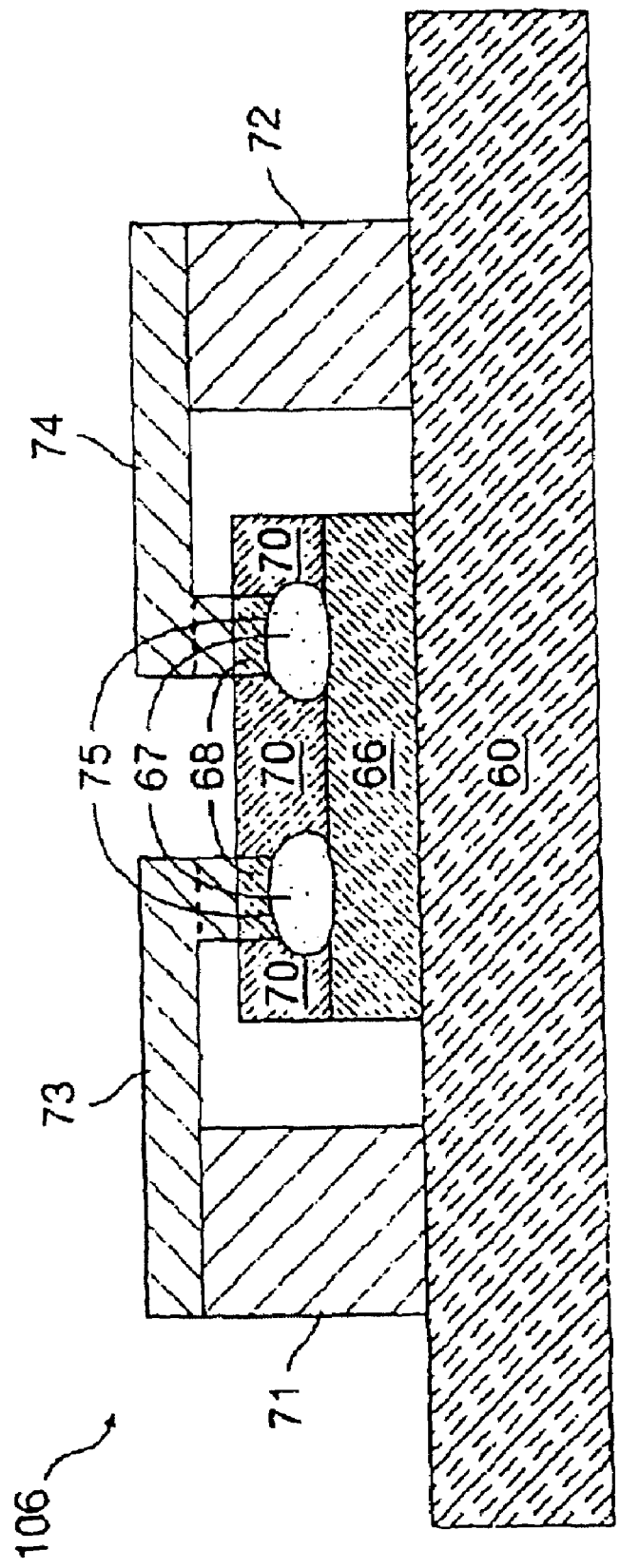
FIG. 9 is a cross section of a directional coupler modulator according to a fifth embodiment of the present invention.

FIG. 9 illustrates a cross section of a directional coupler modulator 106 according to a fifth embodiment of the invention. The optical waveguide of the fifth embodiment has a buried-hetero-structure (BH) waveguide structure. An N-cladding layer 66, an I-core layer 67 and a P-cladding layer 68 are deposited on the substrate 60. The side regions of the I-core layer are completely buried by a semi-insulating cladding layer 70. The electrical signals are fed from the traveling-wave electrodes 71, 72 through the air-bridges 73, 74. The optical beam represented by regions 75 is confined in the I-core layer 67 by the higher refractive index in the structure 67, and it can couple with the adjacent waveguide through the semi-insulating buried cladding layer 70. On the other hand, a microwave signal from the traveling-wave electrodes 71, 72 fed by the air bridges 73, 74 concentrate only in the I-core layer 67 of each waveguide by the P-I-N structure and buried layers. Thus, an overlap between the optical intensity and micro-wave signal intensity in the I-core layer increases and reduces the drive voltage while the coupling length is adjusted by changing the separation of the pair of optical waveguides. Compared with the ridge waveguide structure, the BH optical waveguide structure is more complicated, but it exhibits optically a lower insertion loss due to tight light confinement.

Figure 10:
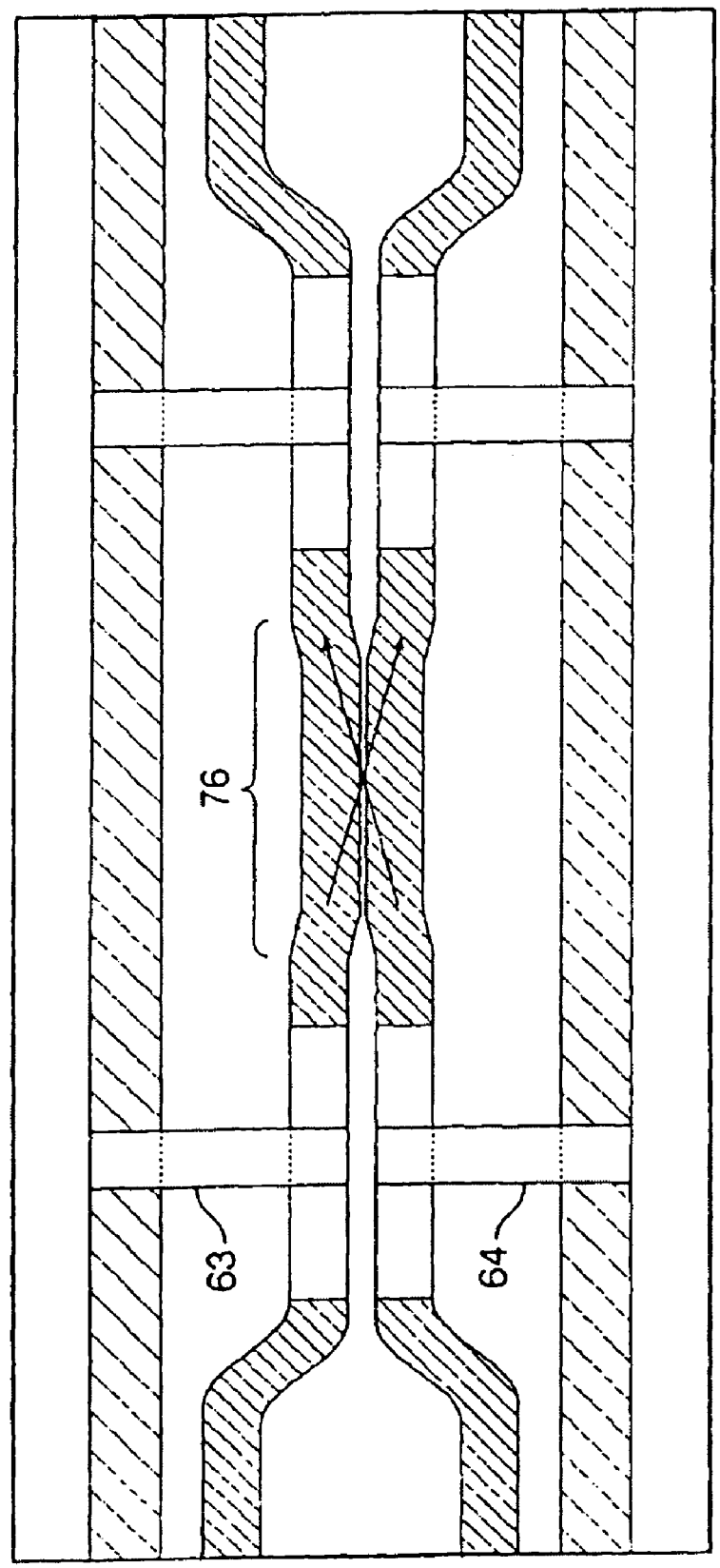
FIG. 10 is a directional coupler modulator according to a sixth embodiment of the present invention.

FIG. 10 illustrates a directional coupler modulator 108 according to a sixth embodiment of the invention. The directional coupler modulator 108 includes a conventional cross-state directional coupler region 76 instead of a cross waveguide. It is noted that the separation of the pair of waveguide segments is reduced compared to the waveguides in the first or second directional coupler regions. This structure leads to a shorter coupling length and provides a more compact modulator.

Figure 11:
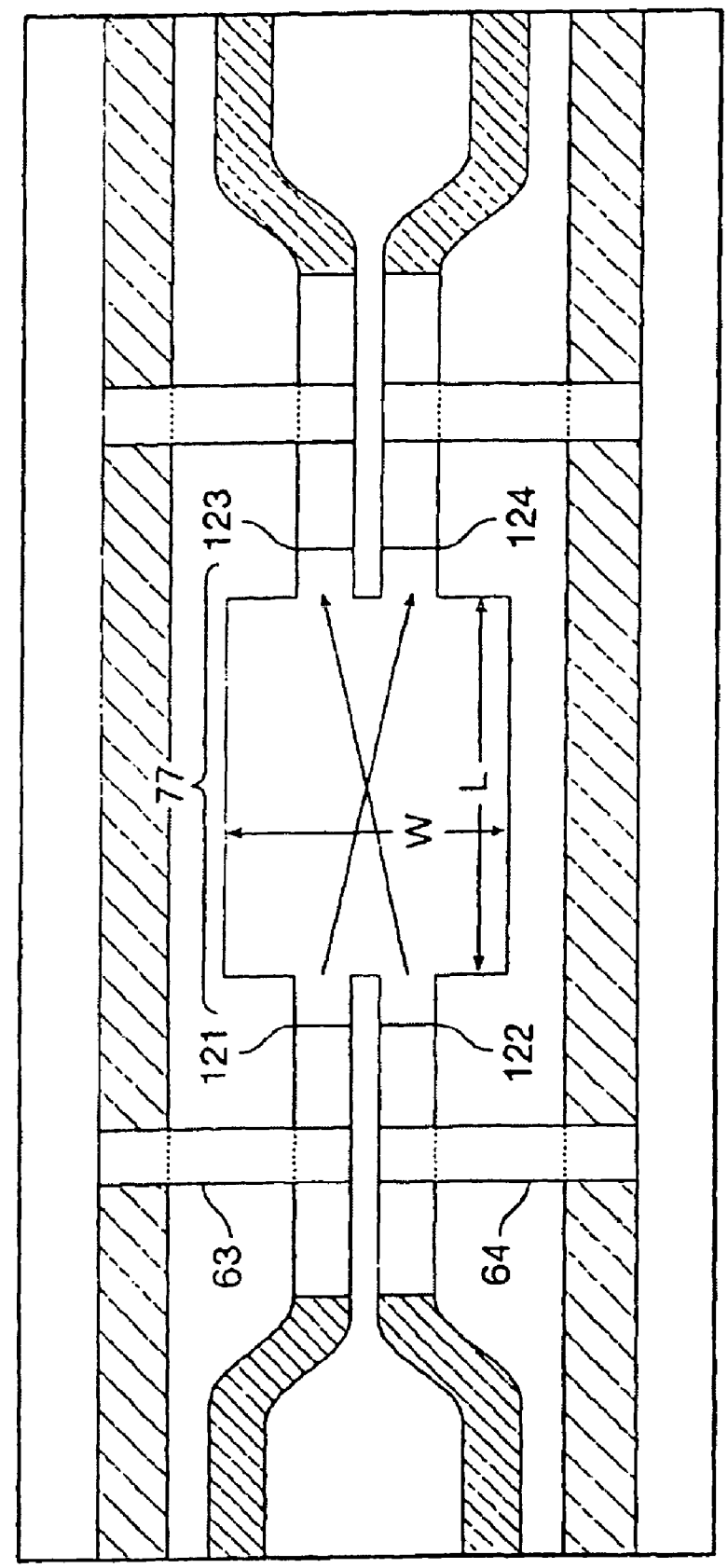
FIG. 11 is a directional coupler modulator according to a seventh embodiment of the present invention.

FIG. 11 illustrates a directional coupler modulator 110 according to a seventh embodiment of the invention, wherein a 2×2 Multi-Mode-Interference (MMI) coupler 77 is employed with two input ports 121, 122 and two output ports 123, 124. By choosing a width W and a length L for the 2×2 MMI coupler 77, mirrored images can be obtained at opposite waveguides as described by Dr. L. B. Soldano et. al., "Optical Multi-Mode Interference Devices Based on Self-imaging: Principles and Applications" Journal of Lightwave Technology, vol. 13, No. 4, pp. 615–627, April 1995. Thus using the same layered structure of the directional coupler region, a simple crossover waveguide can be built into a chip.

Figure 12:
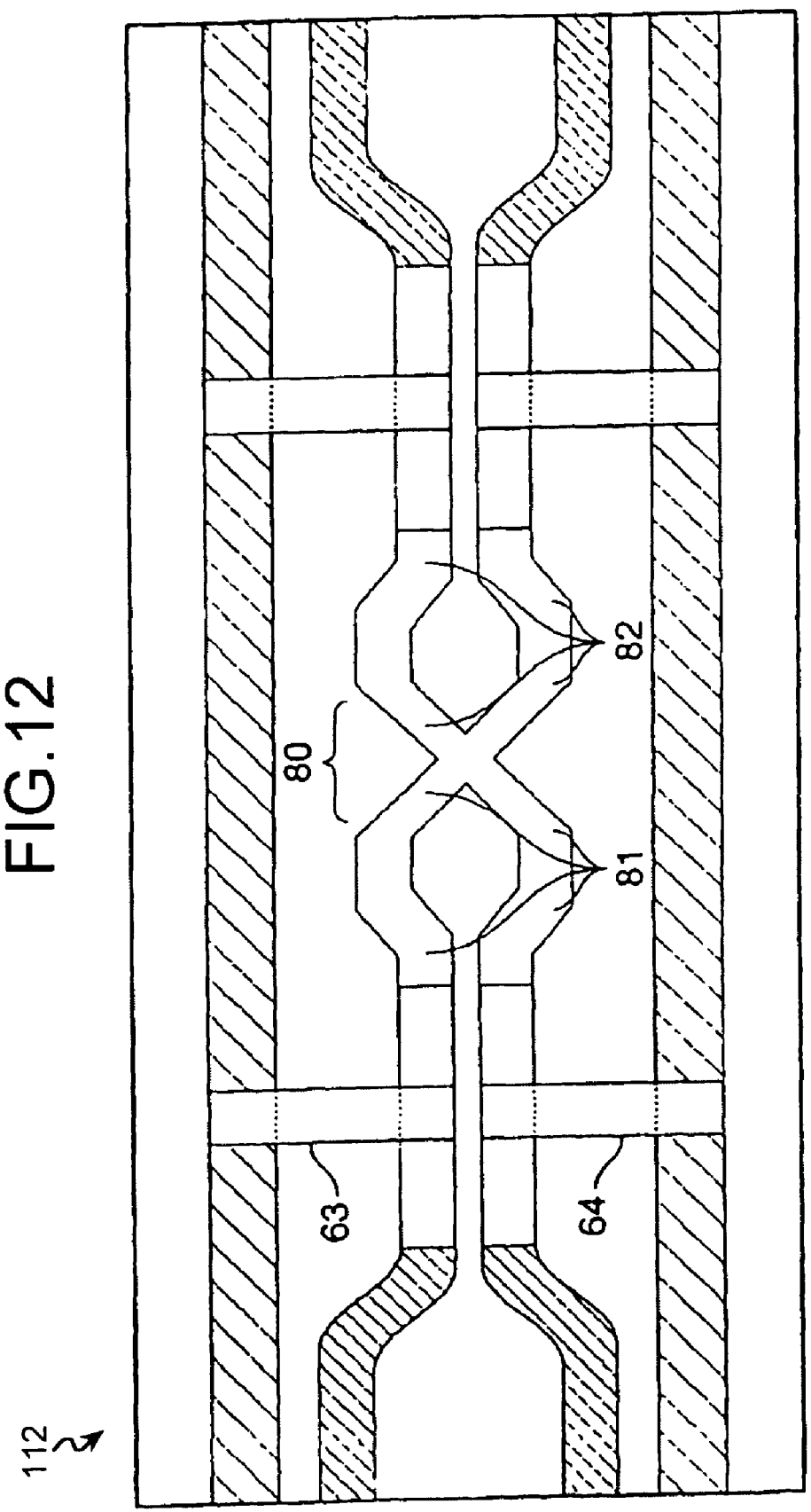
FIG. 12 is a directional coupler modulator according to an eighth embodiment of the present invention.

FIG. 12 illustrates a directional coupler modulator 112 according to an eighth embodiment of the invention.

A simple X type cross waveguide 80 and bending waveguides 81, 82 are used in the coupling region. In this structure, a wavelength independent cross waveguide is obtained using a relatively simple structure, since it is not necessary to control precisely the waveguide structural parameters required for directional couplers and 2×2 MMI couplers.

Figure 13:
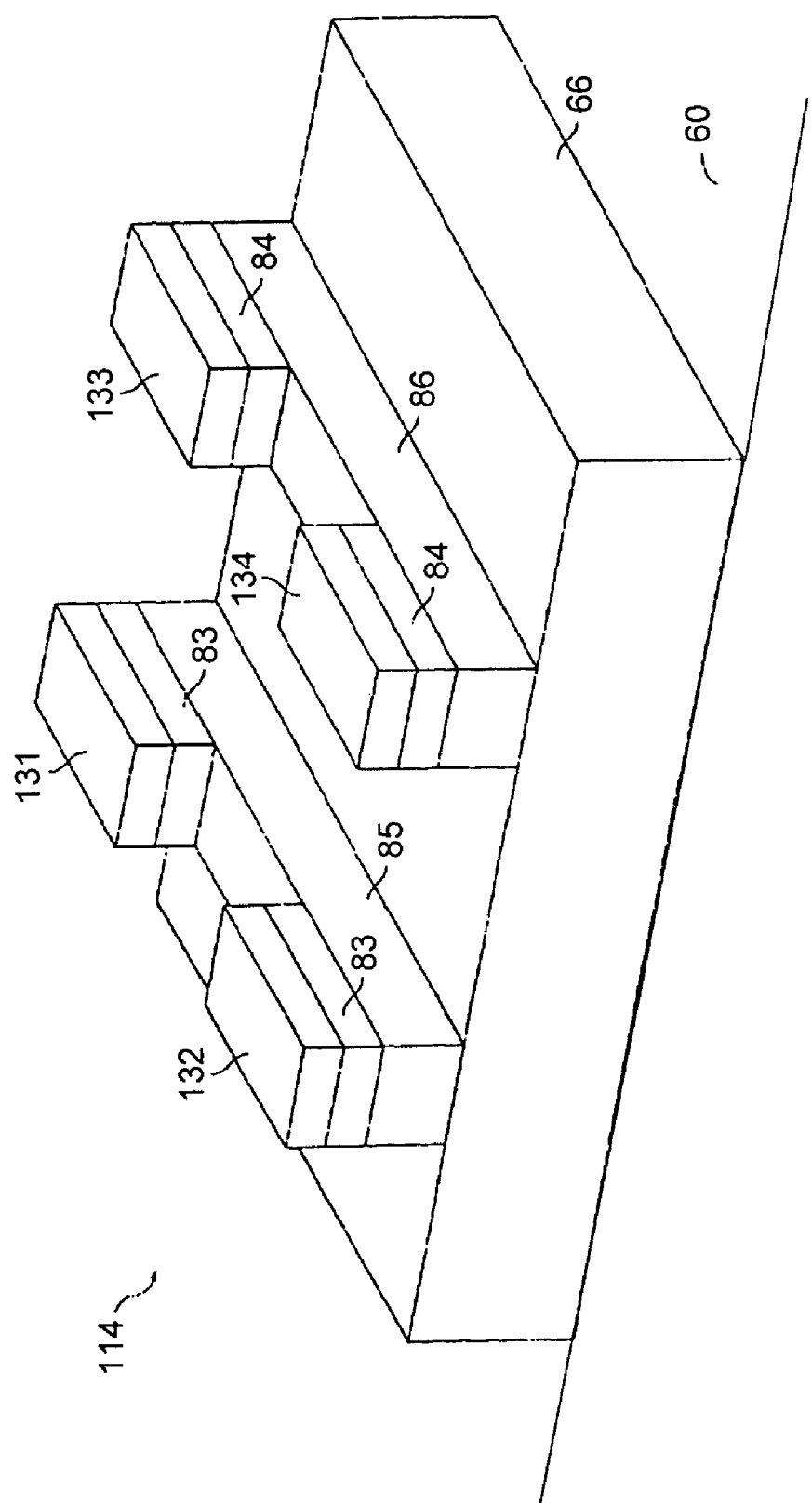
FIG. 13 is a directional coupler modulator according to a ninth embodiment of the present invention.

FIG. 13 illustrates a perspective view (not to scale) of a portion of a directional coupler modulator 114 according to a ninth embodiment of the invention. Traveling-wave transmission is significantly affected by the interaction of each electrode on the optical waveguide. To maintain good traveling-wave transmission characteristics, one can eliminate the interaction of those electrodes. When the isolation is not enough, the backward transmission is easily induced and degrades the electrical return loss. This suggests that each electrode should be isolated electrically. Referring to FIG. 13, P-clad layers 83, 84 are disposed only under electrodes 131, 132, 133, 134. Undesired P-clad layer material between the electrodes on the optical waveguide is removed. Thus the current between the electrodes is well suppressed. As a result, the interaction otherwise originated by such a leakage current is avoided. On the other hand, an optical beam in I-core layers 85 and 86 and the N-cladding 66 on the substrate 60 can propagate in this region without a large optical loss.

Figure 14:
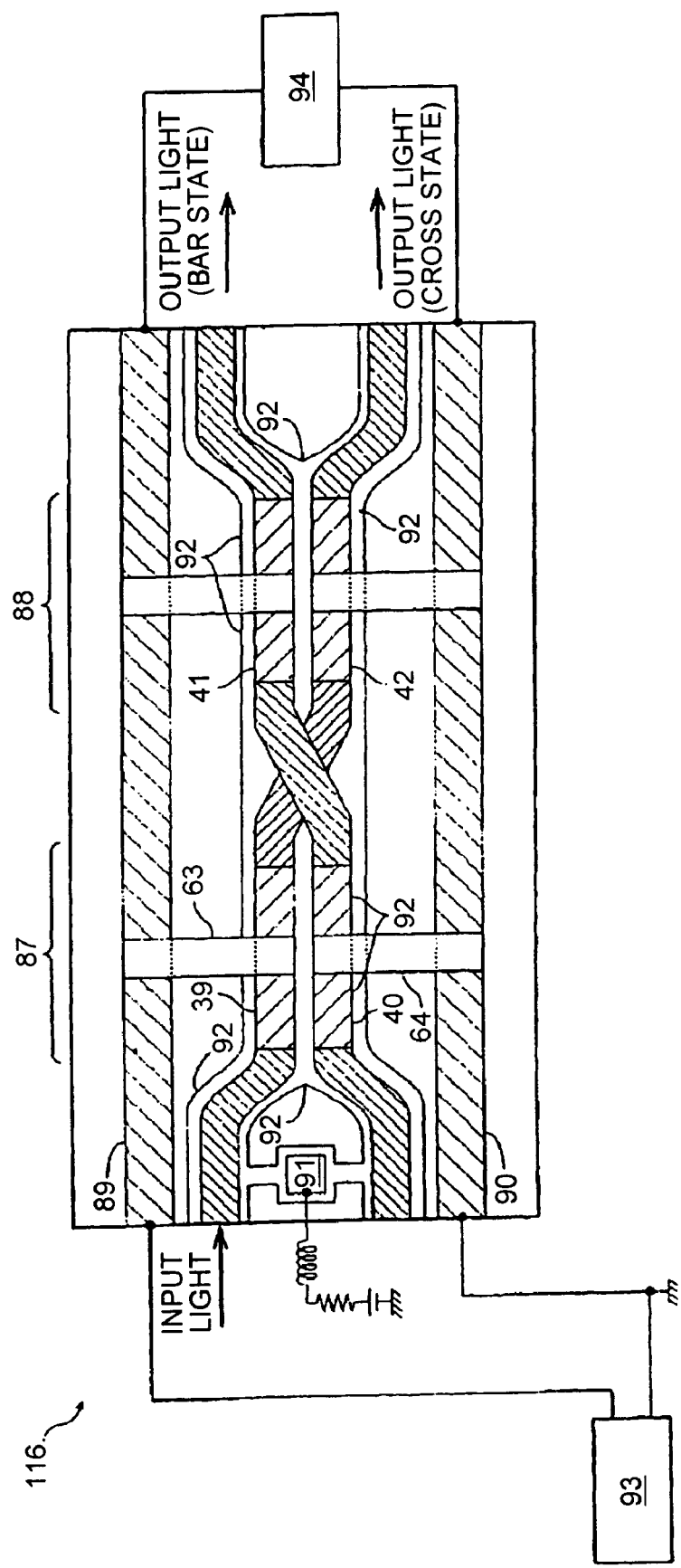
FIG. 14 is a directional coupler modulator according to a tenth embodiment of the present invention.

FIG. 14 illustrates a directional coupler modulator 116 according to a tenth embodiment. It is necessary to provide two directional couplers 87, 88 to operate as a delta-beta switched directional coupler. In each directional coupler, the magnitude of the refractive change of the waveguides should be the same and the polarity should be opposite. Thus the change in the electric field of the electro-optic I-core layer (not shown) should be controlled to obtain desired refractive index changes. The change in the electric field can be induced by the electrodes 39, 40, 41, 42 connected to outer traveling-wave electrodes 89, 90. However, the directional coupler modulator 116 is based on a P-I-N semiconductor structure and has a diode characteristic. A bias electrode 91 is deposited on an N+electrode layer 92, and this N+electrode layer 92 is also disposed below the whole optical waveguide. Therefore, the bias electrode 91 causes all waveguides to be in a negative bias region of a diode characteristic during the modulation mode. It should be noted that the voltage applied from the bias electrode is half of the RF input signal from the signal generator 93 for the negative bias condition.

Figure 15:
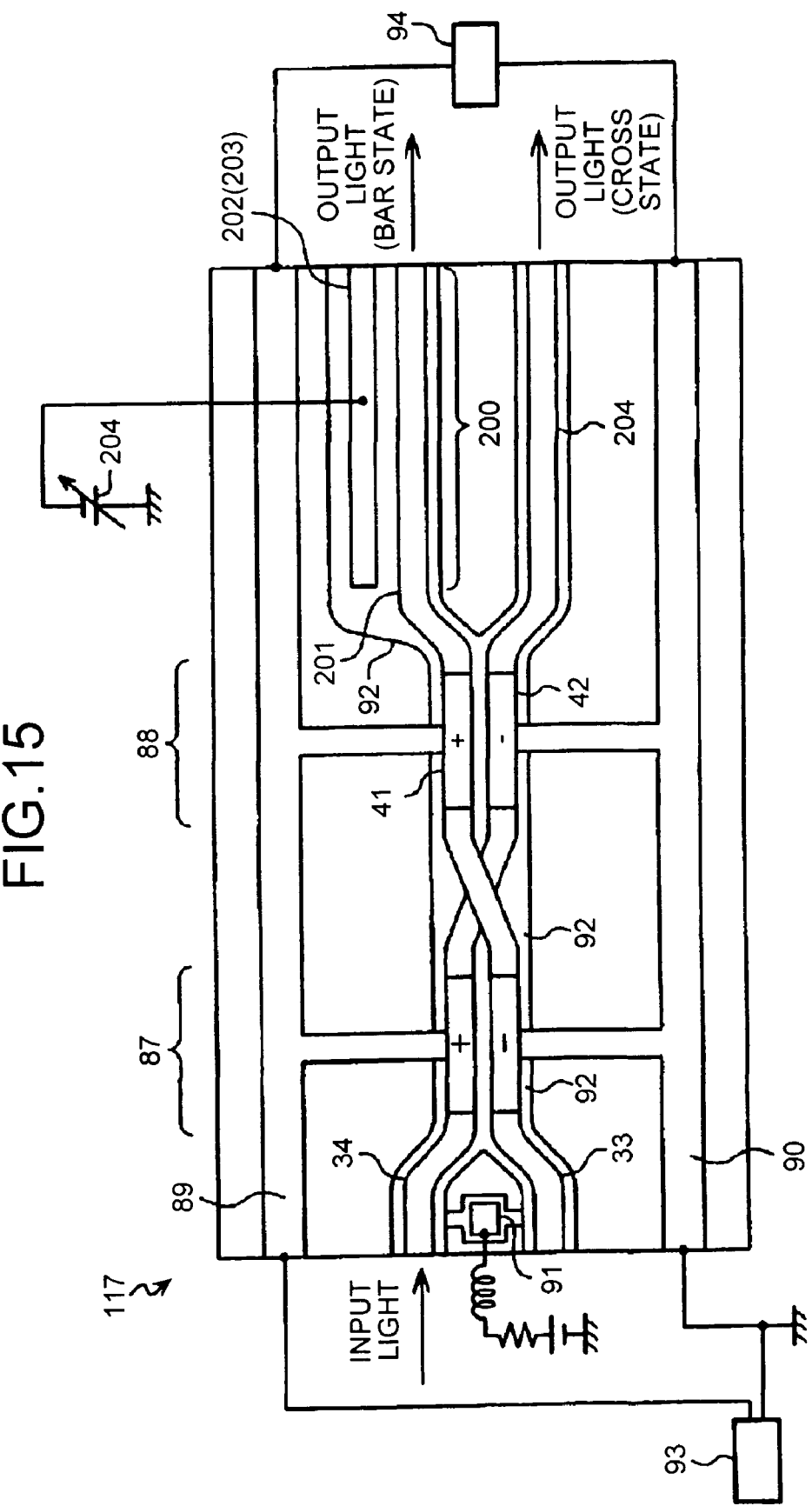
FIG. 15 is a directional coupler type modulator according to an eleventh embodiment of the present invention.

FIG. 15 illustrates a directional coupler modulator 117 according to an eleventh embodiment. The directional coupler modulator 117 includes an attenuator 200 on an output side of the structure shown in FIG. 14. The attenuator 200 includes optical waveguides 201, 202, electrode 203 deposited on a P-layer (not shown) of the optical waveguide 202, and the N+electrode layer deposited below the optical waveguides 201, 202. A variable DC power source 205 applies a voltage to the electrode 203. The length of the optical waveguide 202 is, for example, an even multiple of joining length $(=\pi/(2\kappa))$.

When the voltage between the N+ electrode and the electrode 203 is 0 volt, the light that propagates through the optical waveguide 201 is output as it is. However, when the voltage is other than 0 volt, a portion of the light that propagates through the optical waveguide 201 is output from the optical waveguide 202. In other words, when the voltage is other than 0 volt, the light output from the optical waveguide 201 is attenuated. The amount of attenuation depends on the voltage applied to the electrode 203. The voltage is applied in such a manner that the light output from the optical waveguide 201 suits with the requirement of the optical communications system (not shown) connected to the wavelength guide 201. Since the electrode 203 is separated from the optical waveguide 201, it does not cause any bad effect of the electrode 41. In other words, the directional coupler modulator 117 has good modulation characteristics.

The length of the optical waveguide 202 may be an odd multiple of joining length. Moreover, as the light output can be controlled by controlling the voltage, the length of the optical waveguide 202 need not be an integer multiple of joining length. Moreover, light may be output from the optical waveguide 202 instead of the optical waveguide 201. Furthermore, FIG. 15 illustrates that the electrode 203 is provided in the top side but it may be provided on the bottom side. Moreover, light may be output from an optical waveguide 204, which is continuation of the optical waveguide 33, instead of the optical waveguide 201. Furthermore, the attenuator 200 may be provided on an input side of the structure shown in FIG. 14. According to the structure shown in FIG. 14, users can obtain two chirp parameter from one output port by simply changing the DC voltage.

Figure 16:
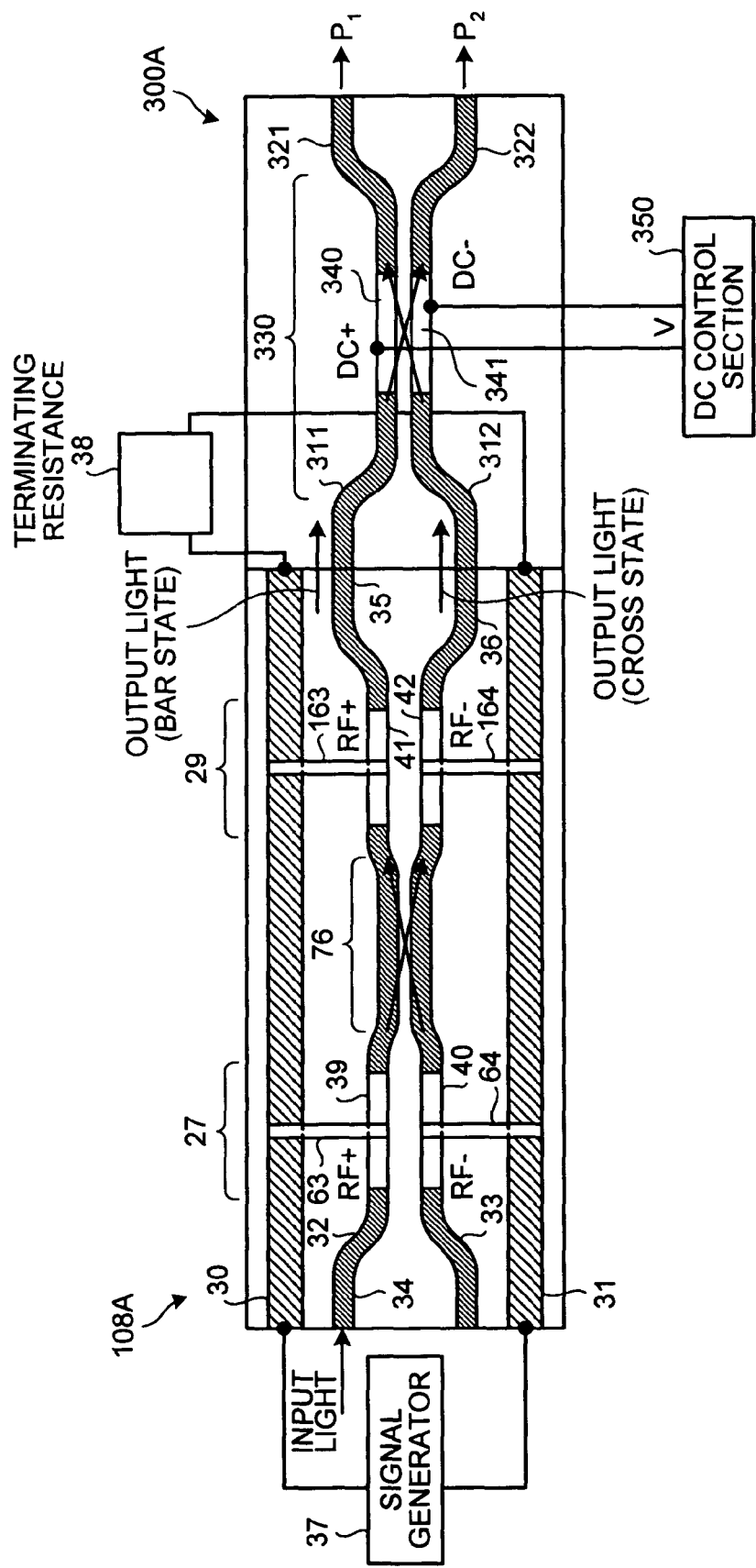
FIG. 16 is a directional coupler type modulator and a directional coupler according to a twelfth embodiment of the present invention.

The directional coupler type modulator is generally delivered to users after adjusting an optical waveguide to output the light. Thus, the users cannot change the output port. A twelfth embodiment provides a structure in which the user can change the output port as desired. FIG. 16 illustrates this structure. A directional coupler type modulator 108A and the directional coupler 300A are connected side-by-side. Light from the optical waveguide 35 (or the optical waveguide 36) can be output from any of the output ports 321 and 322 as desired by adjusting a voltage of a DC control section 350.

The directional coupler 300A has two input and two output ports. Optical waveguides 311 and 312 are in the crossed-state to constitute a cross state section 330. The cross state section 330 has the same configuration as that of the cross state directional coupler 76 (see FIG. 10). The optical waveguide 311 is connected to the optical waveguide 35, to lead the output light (bar state). The optical waveguide 312 is connected to the optical waveguide 36, to lead the output light (cross state). An electrode 340 is connected to the optical waveguide 331, and an electrode 341 is connected to the optical waveguide 332. The DC control section 350 applies a DC voltage V ($0 \leq V \leq Vm$) to the electrodes 340, 341. The user can change the DC voltage V applied by the DC control section 350 to the electrodes 340, 341.

Figure 17:
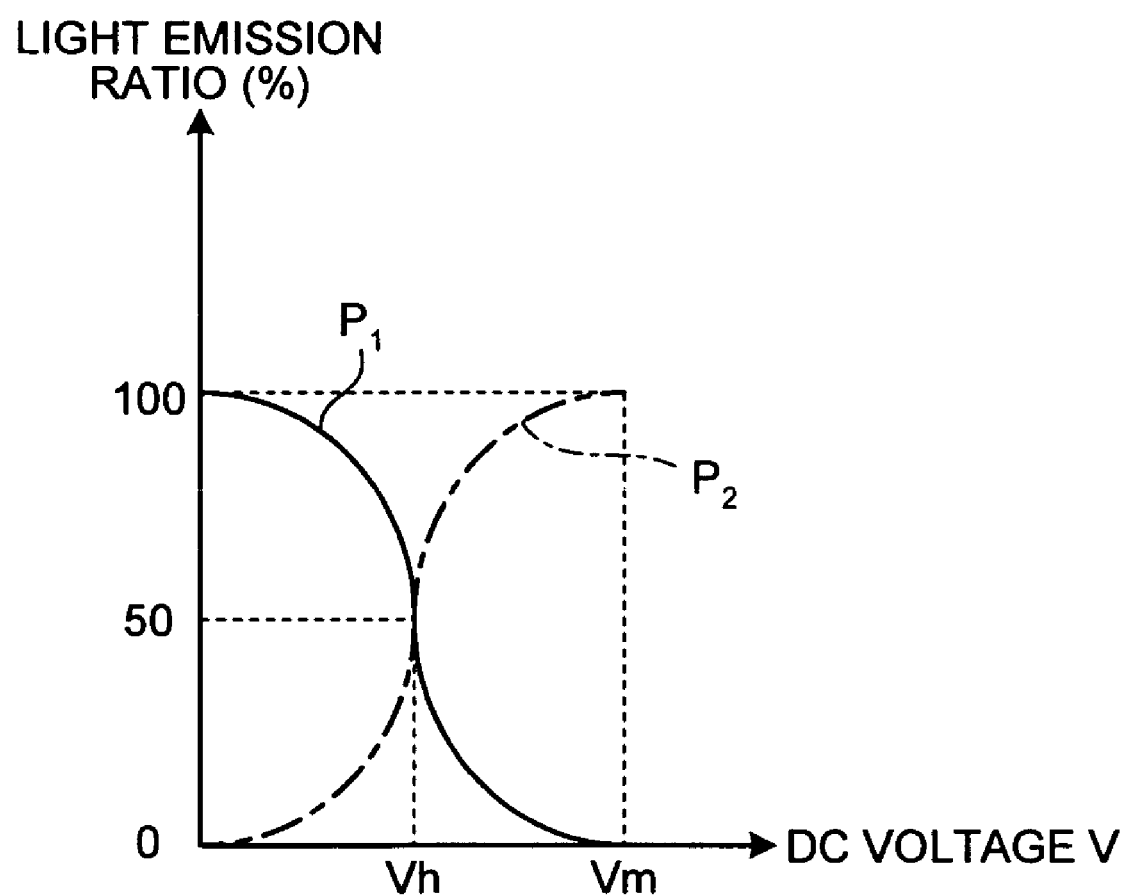
FIG. 17 is a graph of DC voltage against light emission output ratio according to the twelfth embodiment.

FIG. 17 illustrates a relationship between ratio of light output from the output ports 321 (curve P1), 322 (curve P2). When the DC voltage is zero, almost all the light received from the optical waveguide 35 is output from the output port 321. As the DC voltage V increases, the light output from the output port 321 decreases, and that output from the output port 322 increases. When the DC voltage is Vh (=Vm/2), same amount of light is output from the output ports 321 and 322. When the DC voltage is Vm, almost all the light is output from the output port 322. Thus, by operating the DC control section 350 the users can easily select the port to output the light. The directional coupler type modulator 108A may be any directional coupler type modulator explained above.

Figure 18:
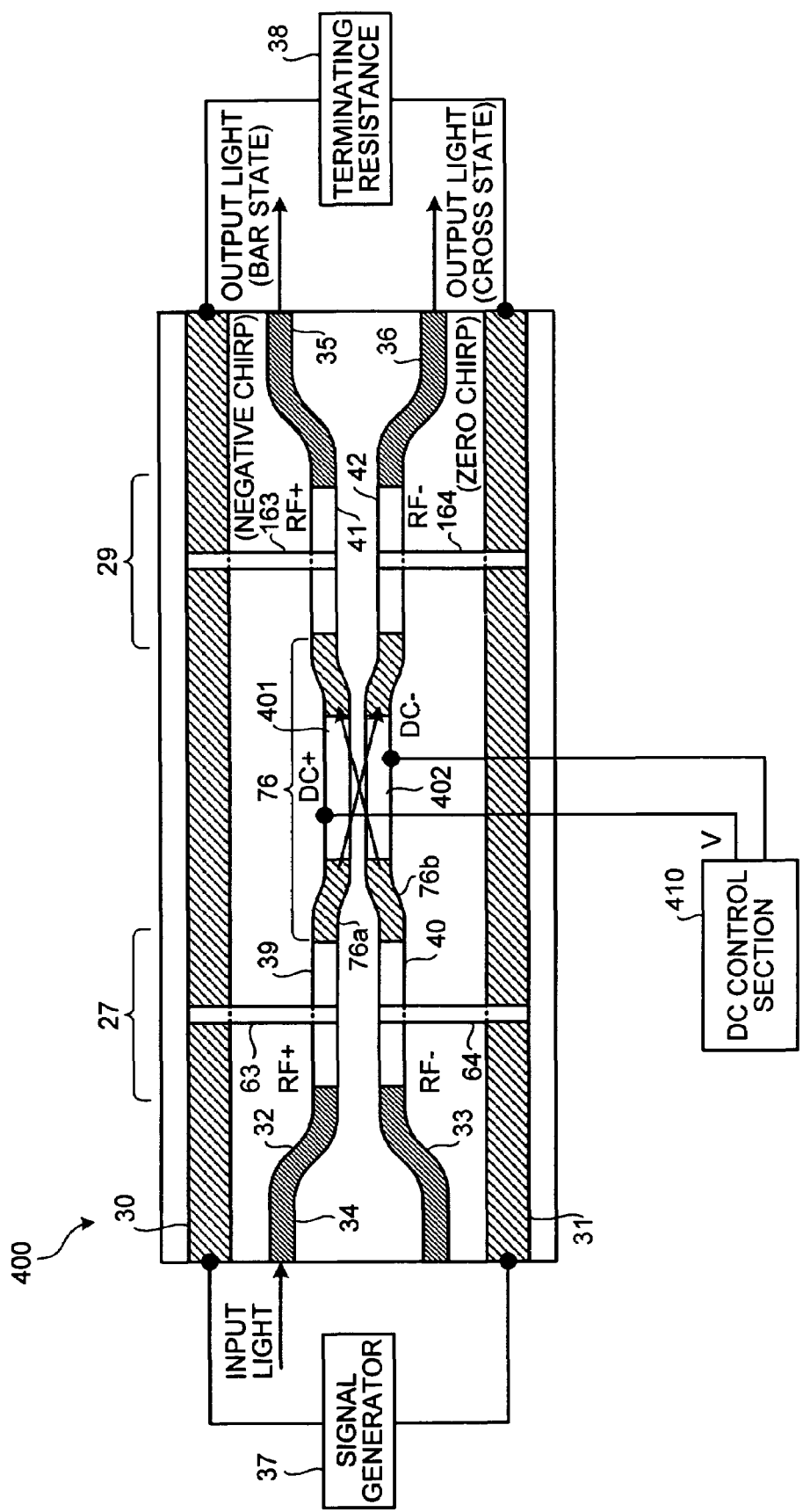
FIG. 18 is a directional coupler type modulator according to a thirteenth embodiment of the present invention.

The directional coupler type modulator 108 may be DC controlled to obtain the same effect as the twelfth embodiment. This structure is explained below as a thirteenth embodiment. FIG. 18 is a directional coupler type modulator 400 according to the thirteenth embodiment. In this figure, like reference signs refer to like parts in FIG. 16. An electrode 401 is connected to an optical waveguide 76a, and an electrode 402 is connected to an optical waveguide 76b. A DC control section 410 applies a DC voltage to the electrodes 401, 402. Users can change the DC voltage.

Generally a negative chirp (frequency variation) occurs in the optical port 35, while zero chirp occurs in the optical port 36. The thirteenth embodiment has an advantage that a chirp parameter alpha expressing the negative chirp can be changed as desired (for example, −0.1 to −1.0), by applying an appropriate DC voltage to the electrodes 401, 402. It should be noted that, on chirp occurs in the optical port 36 even when the DC voltage is applied to the electrodes 401, 402.

In the tenth embodiment (see FIG. 14), a configuration example for applying a DC bias voltage is explained. However, in other embodiments, a DC bias voltage is applied for the same purpose as that of the tenth embodiment. Such a configuration example for applying a DC bias will be explained as a fourteenth embodiment.

Figure 19:
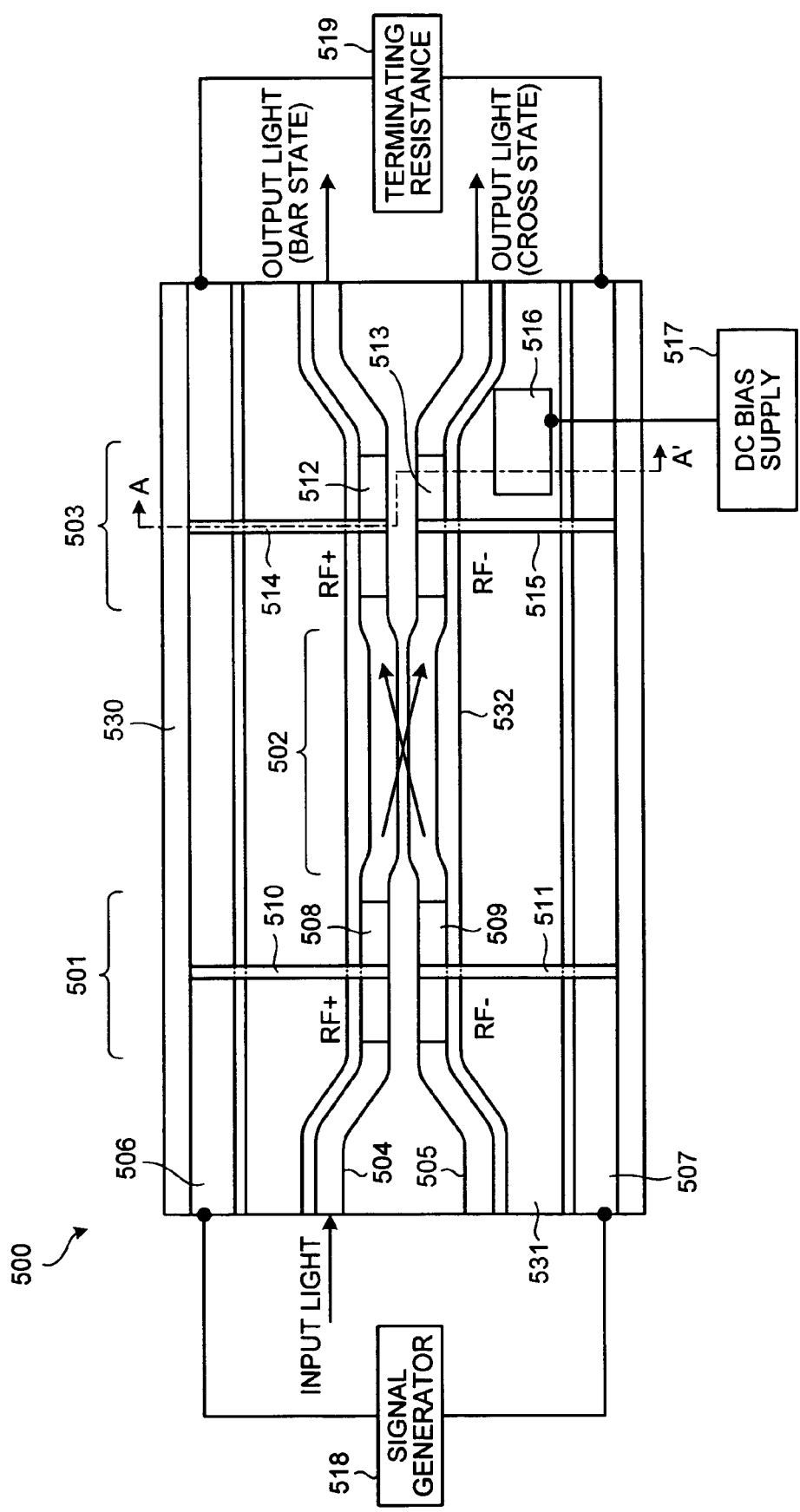
FIG. 19 is a directional coupler type modulator according to a fourteenth embodiment of the present invention.
Figure 20:
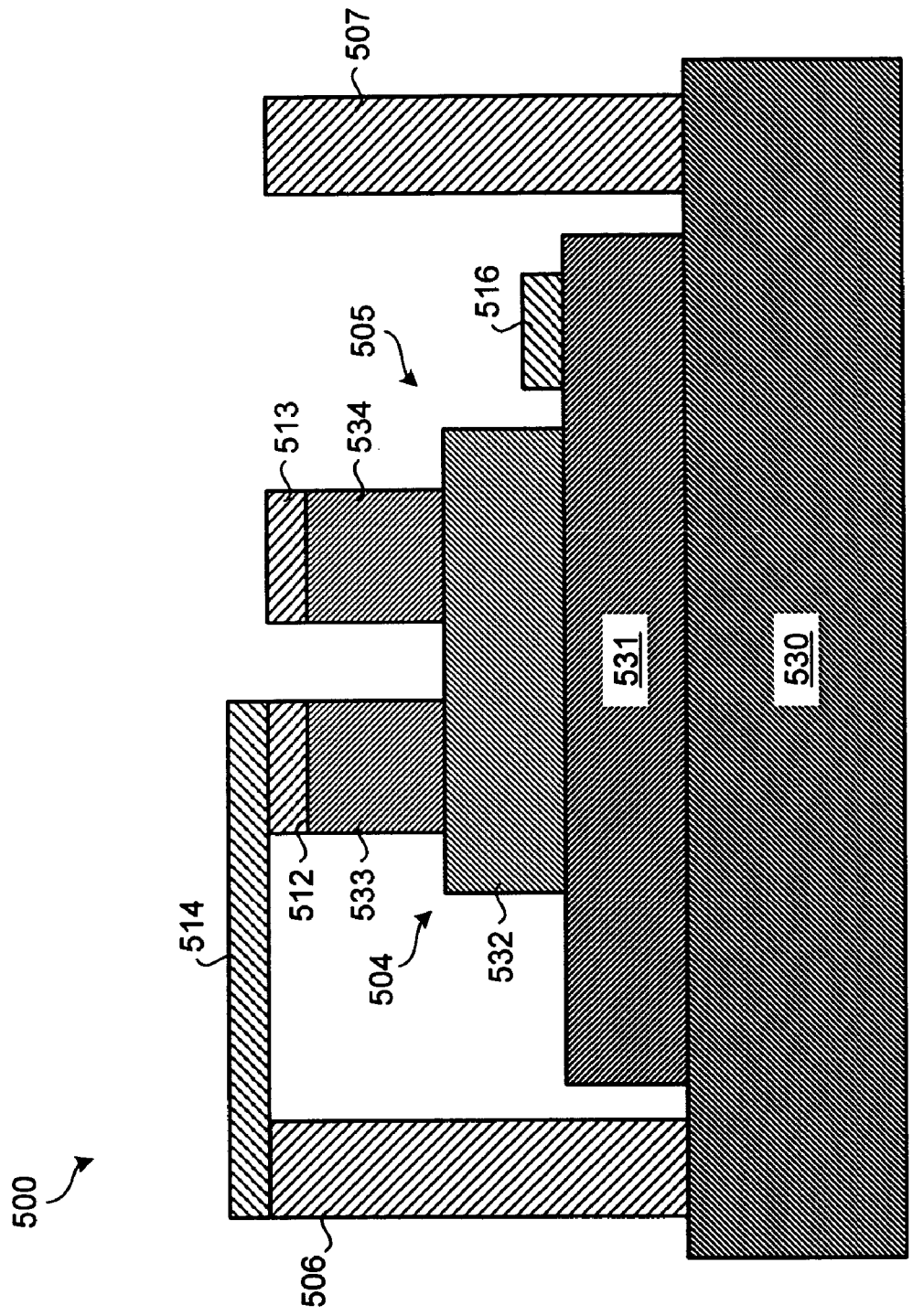
FIG. 20 is a cross section of the directional coupler type modulator according to the fourteenth embodiment.

FIG. 19 illustrates a directional coupler type modulator 500 in the fourteenth embodiment of the present invention. FIG. 20 is a longitudinal section along line A–A' in FIG. 19.

A directional coupler type modulator 500 shown in FIG. 19 comprises first and second directional couplers 501 and 503 using first and second sections of a pair of optical waveguides 504 and 505, and a cross state directional coupler 502, being a portion between the first and the second directional couplers 501 and 503 in the optical waveguides 504 and 505.

The first directional coupler 501 comprises optical waveguides 504 and 505, and control electrodes 508 and 509, which are arranged along the optical waveguides 504 and 505, and apply an electric field to the respective I-core layers in the optical waveguides 504 and 505 to change the refractive index thereof with respect to the TE wave.

The optical waveguides 504 and 505 have the PIN structure, as in other embodiments, in which the I-core layer is put between the P-layer and the N-layer. The refractive index of the I-core layer is larger than that of the P- and N-cladding layers.

As shown in FIG. 20, the directional coupler type modulator 500 comprises a substrate 530 consisting of a semi-insulating sphalerite type crystal such as InP, an N-cladding layer 531 deposited on the substrate 530, traveling-wave electrodes 506 and 507, an I-core layer 532 and a DC bias applying electrode 516 deposited on the N-cladding layer 531, P-cladding layers 533 and 534 deposited on the I-core layer 532, control electrodes 512 and 513, respectively deposited on the P-cladding layers 533 and 534, and an air bridge 514 that electrically connects the traveling-wave electrode 506 and the control electrode 512.

The optical waveguide 504 has the PIN structure consisting of the P-cladding layer 533, the I-core layer 532, and the N-cladding layer 531. Likewise, the optical waveguide 505 has the PIN structure consisting of the P-cladding layer 534, the I-core layer 532, and the N-cladding layer 531.

Returning to FIG. 19, the second directional coupler 503 comprises the optical waveguides 504 and 505, and control electrodes 512 and 513, which are arranged along the optical waveguides 504 and 505, and apply an electric field to the respective I-core layers in the optical waveguides 504 and 505 to change the refractive index thereof with respect to the TE wave.

The cross state directional coupler 502 comprises a pair of optical waveguides arranged in parallel with and close to each other, so that cross state directional coupling occurs, as in the cross state directional coupler 76 (see FIG. 10).

The traveling-wave electrodes 506 and 507 are arranged in parallel, with the optical waveguides 504 and 505 put therebetween. The traveling-wave electrode 506 is electrically connected to the control electrodes 508 and 512 via air bridges 510 and 514.

On the other hand, the traveling-wave electrode 507 is electrically connected to the control electrodes 509 and 513 via air bridges 511 and 515. The DC bias applying electrode 516 is deposited on the N-cladding layer 531 (see FIG. 20), and connected to a DC bias supply 517.

The DC bias supply 517 is a power supply for applying a DC bias voltage to the N-cladding layer 531, which is common to the optical waveguides 504 and 505, via the DC bias applying electrode 516. As explained in the tenth embodiment, the DC bias voltage is a voltage for rendering all optical waveguides to a negative bias (reverse bias) state, which is the diodicity, during the modulation mode, and is a voltage having a value half the largest value of the RF output signal from a signal generator 518.

The signal generator 518 supplies the RF output signal to the traveling-wave electrodes 506 and 507. A terminating resistance 519 is connected to the traveling-wave electrodes 506 and 507.

Figure 21:
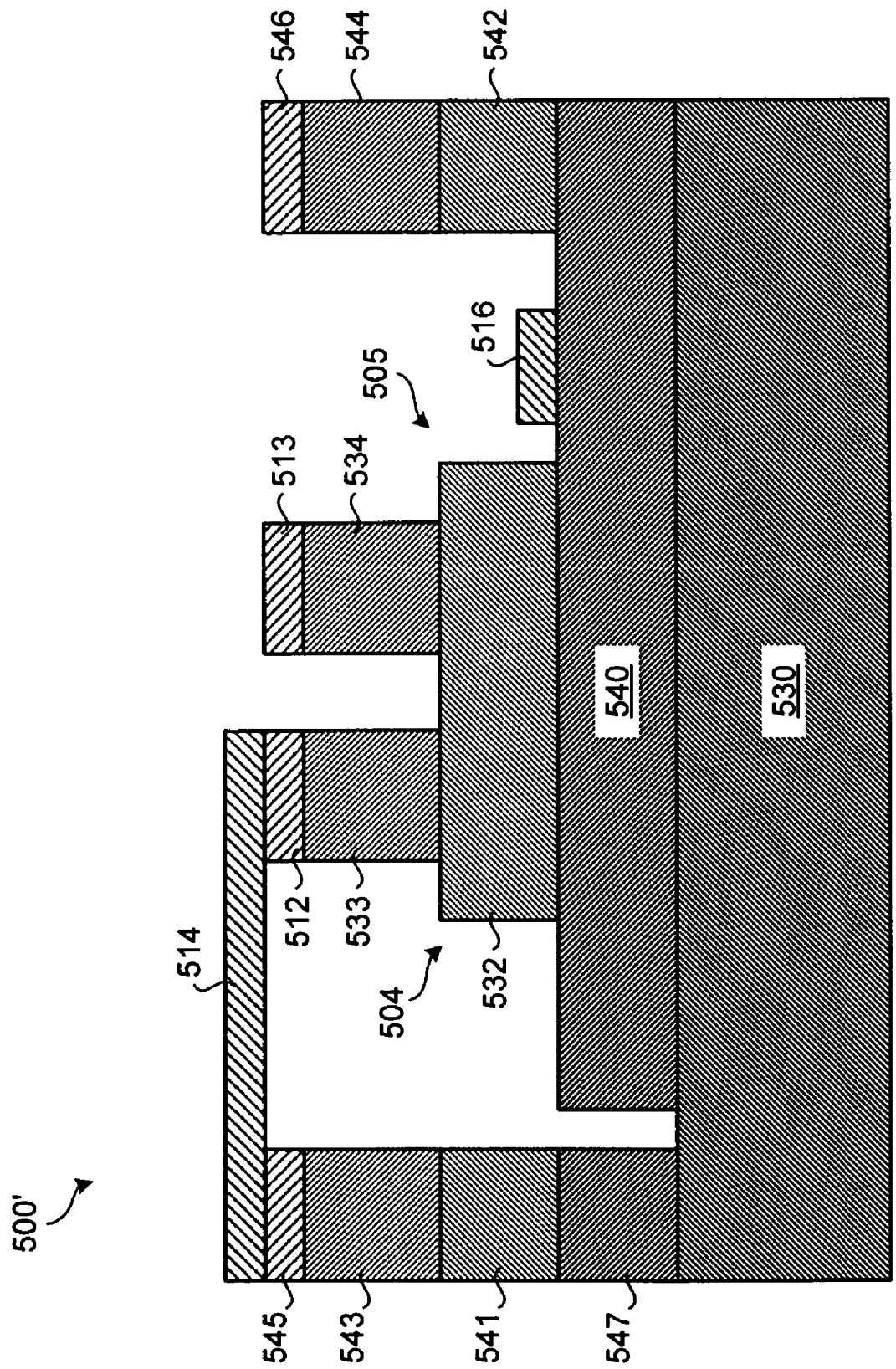
FIG. 21 is a cross section of a directional coupler type modulator according to a fifteenth embodiment of the present invention.

In the fourteenth embodiment, as shown in FIG. 20, a configuration example having the thick traveling-wave electrode 506 and the traveling-wave electrode 507 has been explained, but as shown in FIG. 21, a configuration example having thin traveling-wave electrodes 545 and 546 can be also considered. This configuration example will be explained below as a fifteenth embodiment.

FIG. 21 illustrates a directional coupler type modulator 500' in the fifteenth embodiment. Instead of the N-cladding layer 531 and the traveling-wave electrodes 506 and 507, N-cladding layers 540 and 547, I-core layers 541 and 542, P-cladding layers 543 and 544, and traveling-wave electrodes 545 and 546 are provided.

The N-cladding layers 540 and 547 are deposited on the substrate 530. The I-core layer 532 and the DC bias applying electrode 516 are deposited on the N-cladding layers 540.

The I-core layer 541, the P-cladding layer 543, and the traveling-wave electrode 545 are deposited on the N-cladding layer 547. The traveling-wave electrode 545 is connected to the control electrode 512 via the air bridge 514.

On the other hand, the I-core layer 542, the P-cladding layer 544, and the traveling-wave electrode 546 are deposited on the N-cladding layer 540. The traveling-wave electrode 546 is also connected to the control electrode 513 via the air bridge (not shown). The signal generator 518 and the terminating resistance 519 (see FIG. 19) are connected to the traveling-wave electrodes 545 and 546.

Figure 22:
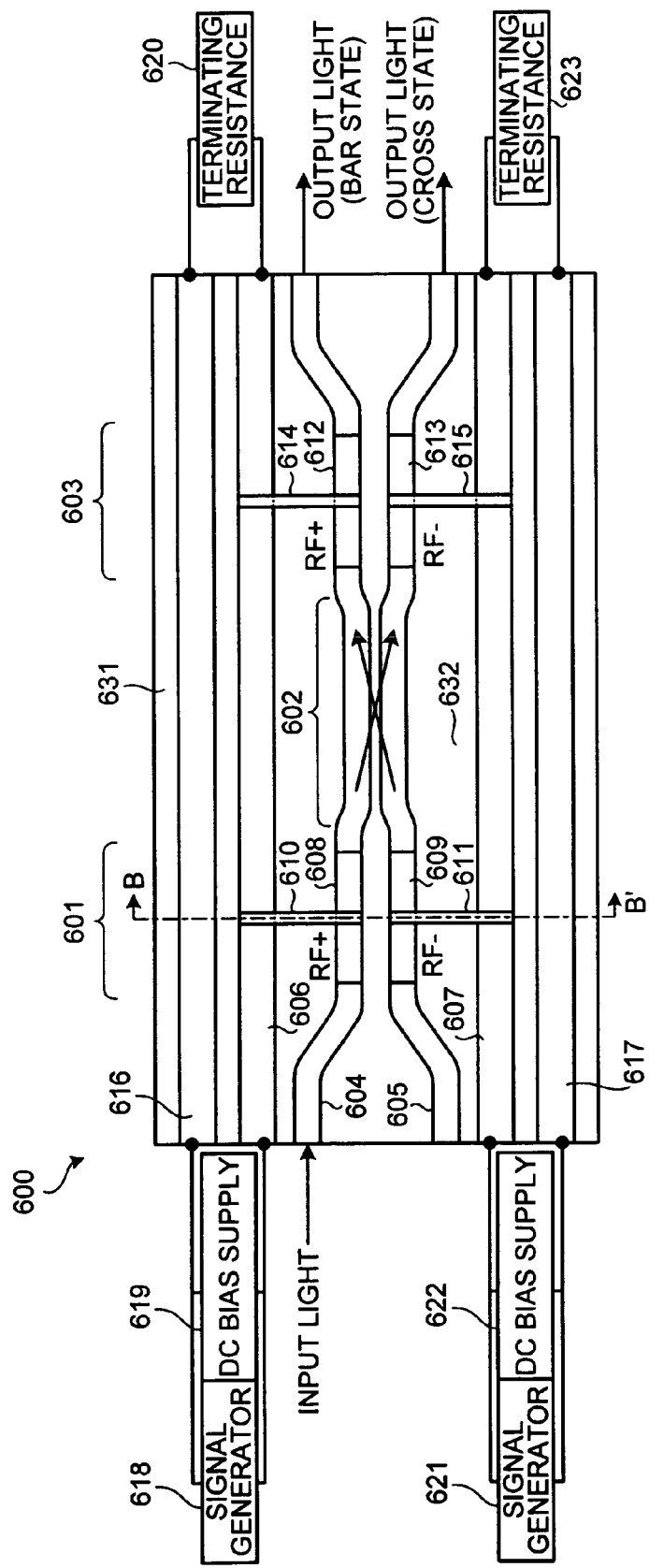
FIG. 22 is a directional coupler type modulator according to a sixteenth embodiment of the present invention.
Figure 23:
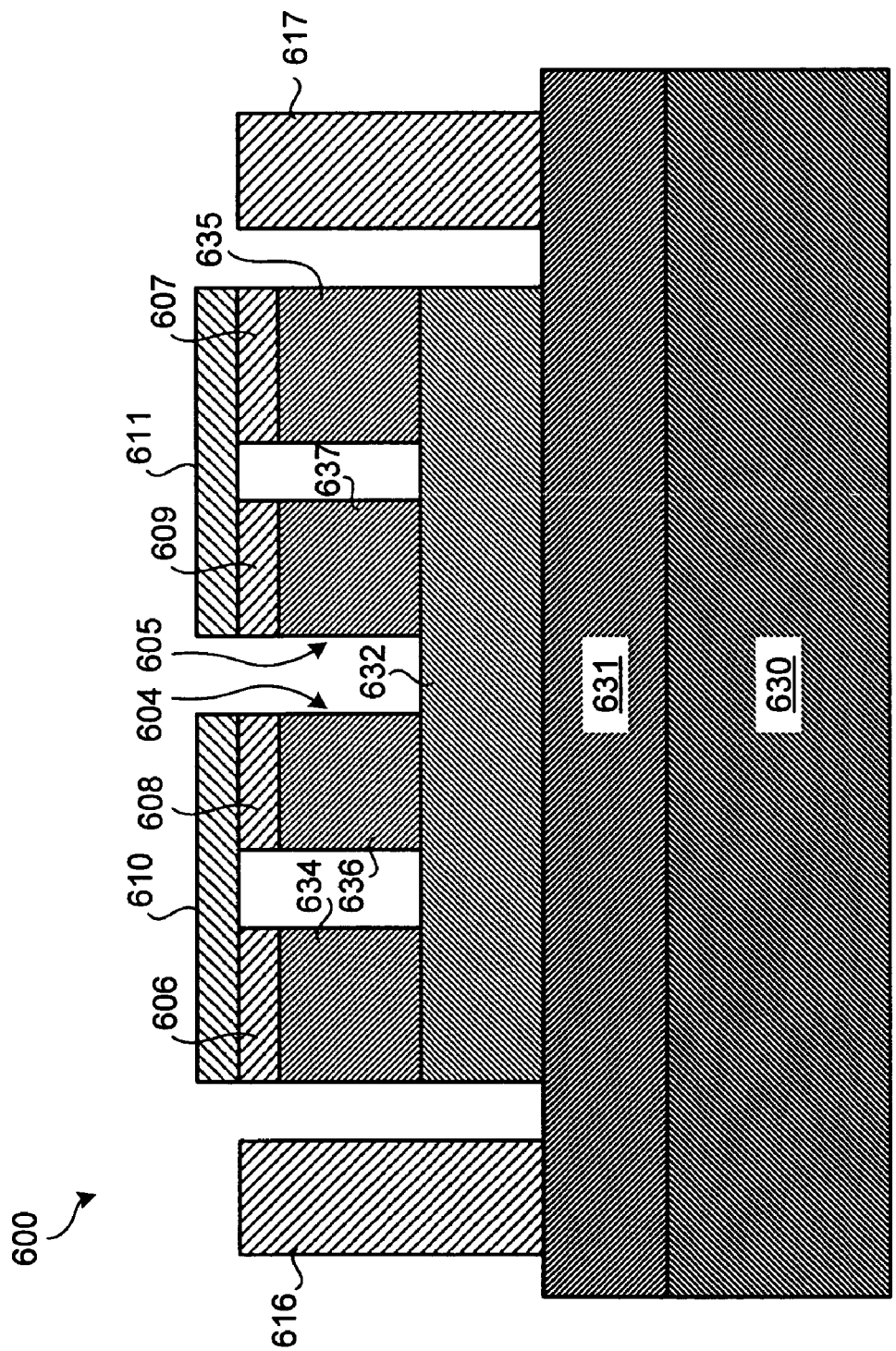
FIG. 23 is a cross section of the directional coupler type modulator according to the sixteenth embodiment.

A configuration example for applying a DC bias voltage has been explained in the tenth, the fourteenth, and the fifteenth embodiments, but the configuration may be as shown in FIGS. 22 and 23.

FIG. 22 illustrates a directional coupler type modulator 600 in the sixteenth embodiment. FIG. 23 is a longitudinal section along line B–B' in FIG. 22.

The directional coupler type modulator 600 comprises first and second directional couplers 601 and 603 using first and second sections of a pair of optical waveguides 604 and 605, a cross state directional coupler 602, being a portion between the first and the second directional couplers 601 and 603 in the optical waveguides 604 and 605, and first to fourth lead electrodes 606, 607, 616, and 617.

The first directional coupler 601 comprises optical waveguides 604 and 605, and control electrodes 608 and 609, which are arranged along the optical waveguides 604 and 605, and apply an electric field to the respective I-core layers in the optical waveguides 604 and 605 to change the refractive index thereof with respect to the TE wave.

The optical waveguides 604 and 605 have the PIN structure, as in other embodiments, in which the I-core layer is put between the P-layer and the N-layer. The refractive index of the I-core layer is larger than that of the P- and N-cladding layers.

As shown in FIG. 23, the directional coupler type modulator 600 comprises a substrate 630 consisting of a semi-insulating sphalerite type crystal such as InP, an N-cladding layer 631 deposited on the substrate 630, third and fourth lead electrodes 616 and 617, and an I-core layer 632 deposited on the N-cladding layer 631, and P-cladding layers 634, 635, 636, and 637 deposited on the I-core layer 632.

The directional coupler type modulator 600 further includes first and second lead electrodes 606 and 607 respectively deposited on the P-cladding layers 634 and 635, control electrodes 608 and 609 respectively deposited on the P-cladding layers 636 and 637, and air bridges 610 and 611, electrically connecting the first lead electrode 606 to the control electrode 608, and the second lead electrode 607 to the control electrode 609, respectively.

The optical waveguide 604 has the PIN structure consisting of the P-cladding layer 636, the I-core layer 632, and the N-cladding layer 631. Likewise, the optical waveguide 605 has the PIN structure consisting of the P-cladding layer 637, the I-core layer 632, and the N-cladding layer 631.

Returning to FIG. 22, the second directional coupler 603 comprises the optical waveguides 604 and 605, and control electrodes 612 and 613, which are arranged along the optical waveguides 604 and 605, and apply an electric field to the respective I-core layers in the optical waveguides 604 and 605 to change the refractive index thereof with respect to the TE wave.

The cross state directional coupler 602 comprises a pair of optical waveguides arranged in parallel with and close to each other, so that cross state directional coupling occurs, as in the cross state directional coupler 76 (see FIG. 10).

The first and the second lead electrodes 606 and 607 are arranged in parallel, with the optical waveguides 604 and 605 put therebetween. The first lead electrode 606 is electrically connected to the control electrodes 608 and 612 via air bridges 610 and 614.

On the other hand, the second lead electrode 607 is electrically connected to the control electrodes 609 and 613 via air bridges 611 and 615.

The third and the fourth lead electrodes 616 and 617 are arranged in parallel, with the first and the second lead electrodes 606 and 607 put therebetween. The first lead electrode 606 is electrically connected to the control electrodes 608 and 612 via air bridges 610 and 614. The third and the fourth lead electrodes 616 and 617 are deposited on the N-cladding layer 632 (see FIG. 23), which is common to the optical waveguides 604 and 605.

A signal generator 618 and a DC bias supply 619 are connected to the first and the third lead electrodes 606 and 616. A terminating resistance 620 is also connected to the first and the third lead electrodes 606 and 616.

Likewise, a signal generator 621 and a DC bias supply 622 are connected to the second and the fourth lead electrodes 607 and 617. A terminating resistance 623 is also connected to the second and the fourth lead electrodes 607 and 617.

The signal generator 618 supplies an RF output signal to the first and the third lead electrodes 606 and 616. The DC bias supply 619 applies a DC bias voltage to the first and the third lead electrodes 606 and 616.

On the other hand, the signal generator 621 operates independently with respect to the signal generator 618, and supplies an RF output signal to the second and the fourth lead electrodes 607 and 617. The DC bias supply 619 operates independently with respect to the DC bias supply 619, and applies a DC bias voltage to the second and the fourth lead electrodes 607 and 617.

The DC bias voltage is, as described above, a voltage for rendering all optical waveguides to the negative bias (reverse bias) state, which is the diodicity, during the modulation mode, and is a voltage having a value half the largest value of the RF output signal.

In the sixteenth embodiment, the RF output signals from the signal generators 618 and 621 may be drive-controlled so as to have the same amplitude and reverse phase (phase difference=180 degrees). When the RF output signals are drive-controlled in the same amplitude and reverse phase, the amplitude (operating voltage) of the RF output signal (signal generators 618 and 621) can be reduced to half, as compared with for example the RF output signal from the signal generator 518 shown in FIG. 19. In the sixteenth embodiment, the third and the fourth lead electrodes 616 and 617 may be grounded.

In the sixteenth embodiment (see FIG. 22), a configuration example in which the third and the fourth lead electrodes 616 and 617 are arranged outside of the first and the second lead electrodes 606 and 607 has been explained, but the reverse arrangement may be adopted.

Figure 24:
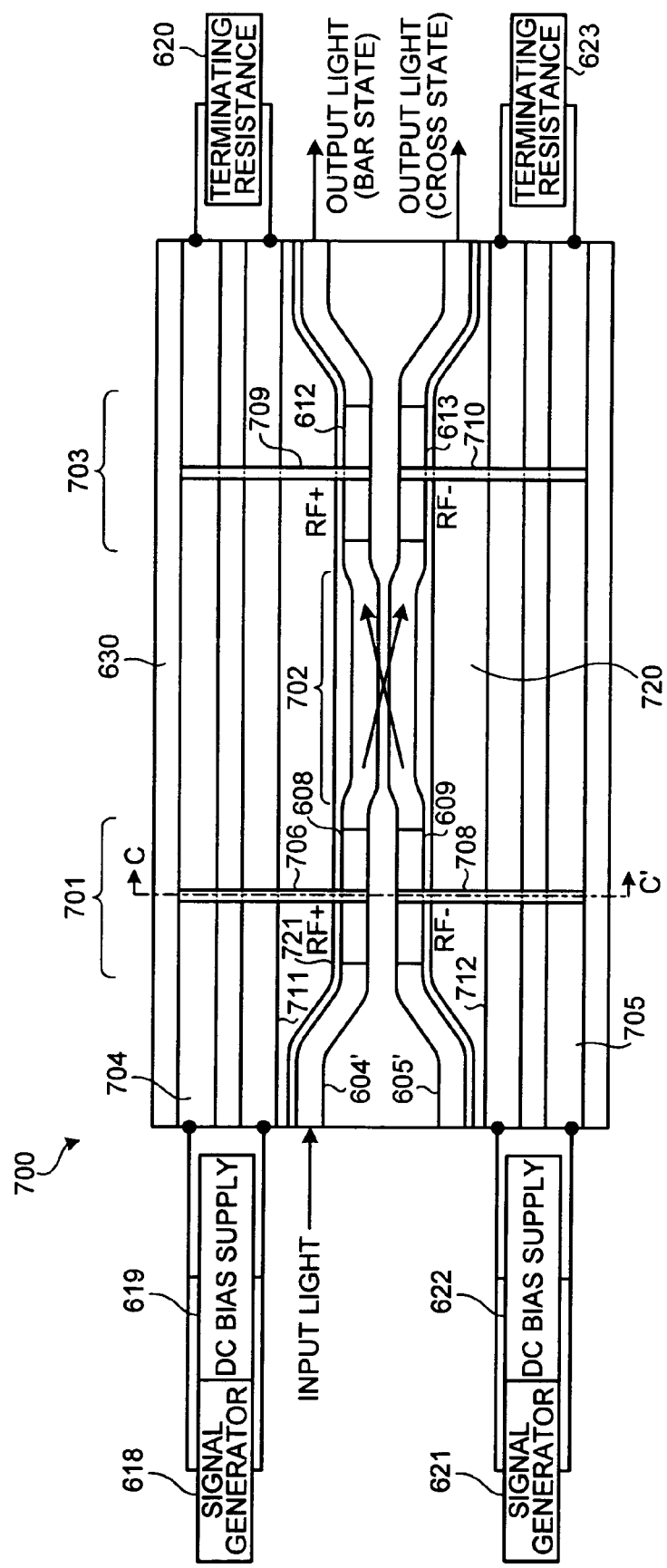
FIG. 24 is a directional coupler type modulator according to a seventeenth embodiment of the present invention.
Figure 25:
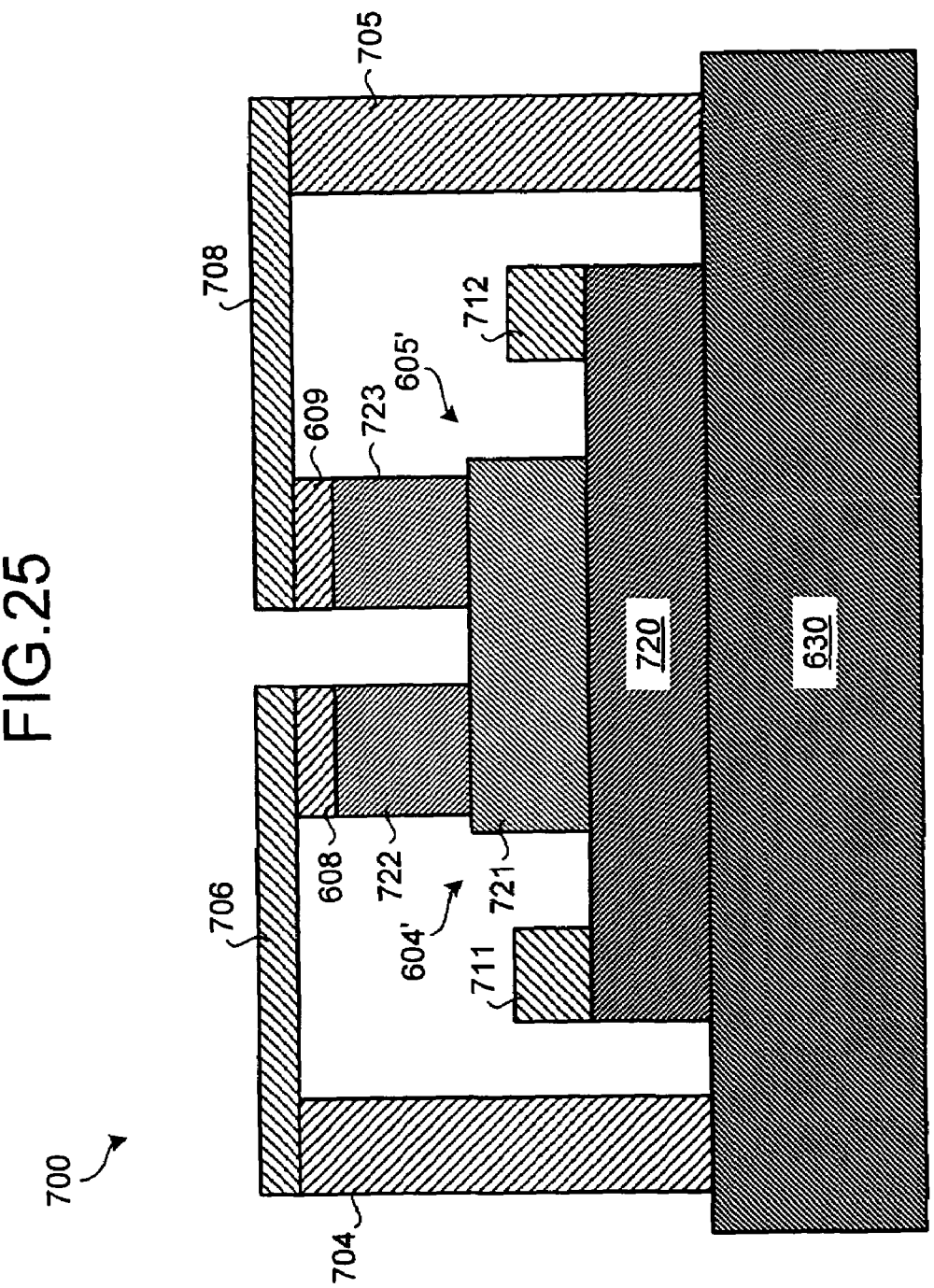
FIG. 25 is a cross section of the directional coupler type modulator according to the seventeenth embodiment.

FIG. 24 illustrates a directional coupler type modulator 700 in a seventeenth embodiment. FIG. 25 is a longitudinal section along line C–C' in FIG. 24. In these figures, like reference signs refer to like parts in FIGS. 22 and 23.

The directional coupler type modulator 700 comprises first and second directional couplers 701 and 703 using first and second sections of a pair of optical waveguides 604' and 605', a cross state directional coupler 702, being a portion between the first and second directional couplers 701 and 703 in the optical waveguides 604' and 605', and first to fourth lead electrodes 704, 705, 711, and 712.

The first directional coupler 701 comprises optical waveguides 604' and 605', and control electrodes 608 and 609, which are arranged along the optical waveguides 604' and 605', and apply an electric field to the respective I-core layers in the optical waveguides 604' and 605' to change the refractive index thereof with respect to the TE wave.

The optical waveguides 604' and 605' have the PIN structure, as in other embodiments, in which the I-core layer is provided between the P-layer and the N-layer. The refractive index of the I-core layer is larger than that of the P- and N-cladding layers.

As shown in FIG. 25, the directional coupler type modulator 700 comprises a substrate 630 consisting of a semi-insulating sphalerite type crystal such as InP, an N-cladding layer 720 and first and second lead electrodes 704 and 705 deposited on the substrate 630, and an I-core layer 721 and third and fourth lead electrodes 711 and 712 deposited on the N-cladding layer 720.

The directional coupler type modulator 700 further includes P-cladding layers 722 and 723 deposited on the I-core layer 721, control electrodes 608 and 609 respectively deposited on the P-cladding layers 722 and 723, and air bridges 706 and 708, electrically connecting the first lead electrode 704 to the control electrode 608, and the second lead electrode 705 to the control electrode 609, respectively.

The optical waveguide 604' has the PIN structure consisting of the P-cladding layer 722, the I-core layer 721, and the N-cladding layer 720. Likewise, the optical waveguide 605' has the PIN structure consisting of the P-cladding layer 723, the I-core layer 721, and the N-cladding layer 720.

Returning to FIG. 24, the second directional coupler 703 comprises the optical waveguides 604' and 605', and control electrodes 612 and 613, which are arranged along the optical waveguides 604' and 605', and apply an electric field to the respective I-core layers in the optical waveguides 604' and 605' to change the refractive index thereof with respect to the TE wave.

The cross state directional coupler 702 comprises a pair of optical waveguides arranged in parallel with and close to each other, so that cross state directional coupling occurs, as in the cross state directional coupler 76 (see FIG. 10).

The first and the second lead electrodes 704 and 705 are arranged in parallel, with the third and the fourth lead electrodes 711 and 712, and the optical waveguides 604' and 605' put therebetween. The first lead electrode 704 is electrically connected to the control electrodes 608 and 612 via air bridges 706 and 709.

On the other hand, the second lead electrode 705 is electrically connected to the control electrodes 609 and 613 via air bridges 708 and 710.

The third and the fourth lead electrodes 711 and 712 are arranged in parallel, with the optical waveguides 604' and 605' put therebetween. The third and the fourth lead electrodes 711 and 712 are deposited on the N-cladding layer 720 (see FIG. 25), which is common to the optical waveguides 604' and 605'.

The signal generator 618 and the DC bias supply 619 are connected to the first and the third lead electrodes 704 and 711. The terminating resistance 620 is also connected to the first and the third lead electrodes 704 and 711.

Likewise, the signal generator 621 and the DC bias supply 622 are connected to the second and the fourth lead electrodes 705 and 712. The terminating resistance 623 is also connected to the second and the fourth lead electrodes 705 and 712.

The signal generator 618 supplies an RF output signal to the first and the third lead electrodes 704 and 711. The DC bias supply 619 applies a DC bias voltage to the first and the third lead electrodes 704 and 711.

On the other hand, the signal generator 621 operates independently with respect to the signal generator 618, and supplies an RF output signal to the second and the fourth lead electrodes 705 and 712. The DC bias supply 619 operates independently with respect to the DC bias supply 619, and applies a DC bias voltage to the second and the fourth lead electrodes 705 and 712.

The DC bias voltage is, as described above, a voltage for rendering all optical waveguides to the negative bias (reverse bias) state, which is the diodicity, during the modulation mode, and is a voltage having a value half the largest value of the RF output signal.

Also in the seventeenth embodiment, the RF output signals from the signal generators 618 and 621 may be controlled so as to have the same amplitude and reverse phase (phase difference=180 degrees). Also in the seventeenth embodiment, the third and the fourth lead electrodes 711 and 712 may be grounded.

As described above, according to the present invention, since the first and the second optical waveguides are arranged at positions where optical crossing occurs, the polarity of the control voltage applied to a pair of first control electrodes (a pair of second control electrodes) can be made the same, thereby enabling arrangement of the first and the second lead electrodes, in which these do not cross each other. As a result, the RF performance is improved, while enlarging the fabrication tolerance of structural parameters, to enable high-frequency modulation operation, thereby contributing to speed-up of the optical communication system.

According to the present invention, when a 2×2 multimode interference coupler, an X crossing waveguide, or the first and the second optical waveguides arranged substantially in parallel with and close to each other are used for the crossing portion, the crossing portion can be formed in the same layer as the optical waveguides in front and behind. As a result, since a solid crossing path is not necessary, manufacturing becomes easy.

According to the present invention, when the first and the second optical waveguides arranged substantially in parallel with and close to each other are used for the crossing portion, the gap between the first and the second optical waveguides in the crossing portion can be made narrower than the gap between these in other regions, thereby enabling a compact configuration.

According to the present invention, since the optical crossing waveguide is connected between the first and the second directional couplers, the polarity of the voltage applied to the control electrodes in the first and the second directional couplers can be made the same, thereby enabling arrangement of the first and the second noncrossing electrodes, in which these do not cross each other. As a result, the RF performance is improved, while enlarging the fabrication tolerance of structural parameters, to enable high-frequency modulation operation, thereby contributing to speed-up of the optical communication system.

According to the present invention, when a 2×2 multimode interference coupler, an X crossing waveguide, or a pair of optical waveguides arranged in parallel with and close to each other so that cross state directional coupling occurs is used for the optical crossing waveguide, the optical crossing waveguide can be formed in the same layer as the optical waveguides in front and behind. As a result, since a solid crossing path is not necessary, manufacturing becomes easy.

According to the present invention, when a pair of optical waveguides arranged in parallel with and close to each other so that cross state directional coupling occurs is used for the optical crossing waveguide, the gap between the optical waveguides can be made narrow than the gap between a pair of optical waveguides in the first directional coupler and the gap between a pair of optical waveguides in the second directional coupler, thereby enabling a compact optical crossing waveguide.

According to the present invention, the first and the second chirp control electrodes are arranged along the first and the second optical waveguides in the crossing portion, so that a chirp control voltage for controlling chirp of light output from the first or second optical waveguide is applied to the first and the second control electrodes. As a result, the chirp can be also controlled, thereby improving the convenience of the user. Users can obtain two chirp parameter from one output port by simply changing the DC voltage.

According to the present invention, since the light output from the first and the second optical waveguides is switching-controlled to either the first port or the second port, switching of ports becomes easy, thereby improving the convenience of the user.

According to the present invention, since the output light from the first or second optical waveguide is guided to the first or second output port by changing the external voltage, to control the output ratio between the first and second output ports, the output ratio can be easily changed, thereby improving the convenience of the user.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An optical switch comprising:
   a first optical waveguide through which light propagates;
   a second optical waveguide arranged at a position where optical crossing occurs with respect to the first optical waveguide, through which light propagates;
   a first lead electrode arranged along the first and the second optical waveguides;
   a pair of first control electrodes arranged along the first optical waveguide so as to face each other, with the crossing portion put therebetween, to which a control voltage controlling the crossing state is applied via the first lead electrode;
   a second lead electrode arranged so as to face the first lead electrode; and a pair of second control electrodes arranged along the second optical waveguide so as to face each other, with the crossing portion arranged therebetween, to which the control voltage is applied via the second lead electrode.

2. The optical switch according to claim 1, wherein the first and the second lead electrodes are arranged so as to face each other, with the first and the second optical waveguides arranged therebetween.

3. The optical switch according to claim 2, wherein the first and the second lead electrodes are arranged substantially parallel with each other.

4. The optical switch according to claim 1, wherein the first and the second optical waveguides are arranged in a physically solid crossing state.

5. The optical switch according to claim 1, wherein the crossing portion constitutes a 2×2 multi-mode interference coupler.

6. The optical switch according to claim 1, wherein the crossing portion constitutes an X crossing waveguide.

7. The optical switch according to claim 1, wherein the first and the second optical waveguides are arranged in the crossing portion, substantially in parallel with and close to each other.

8. The optical switch according to claim 7, wherein a gap between the first and the second optical waveguides in the crossing portion is narrower than a gap between the first and the second optical waveguides in portions other than the crossing portion.

9. The optical switch according to claim 7, comprising first and second chirp control electrodes arranged so as to face each other along the first and the second optical waveguides in the crossing portion, wherein a chirp control voltage is applied to the first and the second chirp control electrodes for controlling chirp of light output from either of the first and the second optical waveguide.

10. The optical switch according to claim 1, wherein each of the first and the second control electrodes has a control electrode piece divided into a plurality of parts in the longitudinal direction.

11. The optical switch according to claim 10, wherein each of the first and the second optical waveguides has a PIN structure in which an I-core layer is put between a P-cladding layer and an N-cladding layer, in regions other than the regions immediately below the control electrode pieces, which are adjacent to each other in the longitudinal direction, wherein corresponding control electrode piece is deposited on the P-layer,
the optical waveguide immediately below a region between the control electrode pieces adjacent to each other in the longitudinal direction has a structure in which the P-layer is removed from the PIN structure, and
the N-layer in the PIN structure is a common layer to the first and the second optical waveguides.

12. The optical switch according to claim 1, wherein each of the first and the second optical waveguides has the PIN structure of a three-layer type, and the first and the second control electrodes are deposited respectively on the P-layer of the first and the second optical waveguides, and
the first and the second optical waveguides have a common N-layer.

13. The optical switch according to claim 1, wherein each of the first and the second optical waveguides has the PIN structure of a one-layer buried type, and the first and the second control electrodes are deposited respectively on the I-layer of the first and the second optical waveguides, and
the first and the second optical waveguides have a common N-layer.

14. The optical switch according to claim 1, further comprising a directional coupler type optical attenuator having
a third optical waveguide formed by extending at least one of the first and the second optical waveguides;
a fourth optical waveguide arranged in parallel with and close to the third optical waveguide, so that optical coupling occurs between the third and the fourth optical waveguides; and
a third control electrode arranged along the fourth optical waveguide, to change the refractive index of the core layer by applying an electric field to the core layer in the fourth optical waveguide.

15. The optical switch according to claim 1, comprising a directional coupler having first and second ports, wherein light output from either of the first and the second optical waveguides is controlled to be output from either of the first and the second ports, by changing an external voltage.

16. The optical switch according to claim 1, comprising a directional coupler having first and second ports, wherein light output from either of the first and the second optical waveguides is guided to the first and the second ports to control the output ratio between the respective first and second ports.

17. An optical communication system comprising an optical switch including
a first optical waveguide through which light propagates;
a second optical waveguide arranged at a position where optical crossing occurs with respect to the first optical waveguide, through which light propagates;
a first lead electrode arranged along the first and the second optical waveguides;
a pair of first control electrodes arranged along the first optical waveguide so as to face each other, with the crossing portion put therebetween, to which a control voltage controlling the crossing state is applied via the first lead electrode;
a second lead electrode arranged so as to face the first lead electrode; and
a pair of second control electrodes arranged along the second optical waveguide so as to face each other, with the crossing portion arranged therebetween, to which the control voltage is applied via the second lead electrode.

* * * * *